United States Patent
Kim

(10) Patent No.: US 10,438,574 B2
(45) Date of Patent: Oct. 8, 2019

(54) SOUND ABSORBING AND INSULATING MATERIAL AND METHOD FOR MANUFACTURING THE SAME

(71) Applicant: Hyundai Motor Company, Seoul (KR)

(72) Inventor: Keun Young Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 491 days.

(21) Appl. No.: 15/185,989

(22) Filed: Jun. 17, 2016

(65) Prior Publication Data

US 2016/0300560 A1    Oct. 13, 2016

Related U.S. Application Data

(63) Continuation of application No. PCT/KR2014/001601, filed on Feb. 27, 2014.

(30) Foreign Application Priority Data

Dec. 19, 2013   (KR) .................. 10-2013-0159412

(51) Int. Cl.
   *G10K 11/162* (2006.01)
   *B60R 13/08* (2006.01)
   (Continued)

(52) U.S. Cl.
   CPC .......... *G10K 11/162* (2013.01); *B29C 70/504* (2013.01); *B32B 37/14* (2013.01);
   (Continued)

(58) Field of Classification Search
   CPC ..... G10K 11/162; B29C 70/504; B60R 13/08; B60R 13/0838; B60R 13/0876;
   (Continued)

(56) References Cited

U.S. PATENT DOCUMENTS 5,923,002 A    7/1999   McGrath et al.
7,137,477 B2   11/2006  Keller et al.
(Continued)

FOREIGN PATENT DOCUMENTS

CN    101445051 A    6/2009
CN    102003250 A    4/2011
(Continued)

OTHER PUBLICATIONS

International Preliminary Report on Patentability and Written Opinion for International Patent Application No. PCT/KR2014/001601, dated Jun. 21, 2016, 11 pages.
(Continued)

*Primary Examiner* — Forrest M Phillips
(74) *Attorney, Agent, or Firm* — Mintz Levin Cohn Ferris Glovsky and Popeo, P.C.; Peter F. Corless

(57) ABSTRACT

Disclosed are a sound absorbing and insulating material and a method for manufacturing the same. The sound absorbing and insulating material may be manufactured by impregnating a polyimide binder into a nonwoven fabric formed of a heat-resistant fiber. As such, the sound absorbing and insulating material may have superior sound-absorbing property, flame retardancy, heat resistance and heat resistance, thus being applicable to parts maintained at high temperatures of 300° C. as well as at room temperature and moldability due to the use of the polyimide binder.

29 Claims, 5 Drawing Sheets

(51) Int. Cl.
    *F02B 77/13*     (2006.01)
    *B29C 70/50*     (2006.01)
    *B32B 37/14*     (2006.01)
    *D04H 1/4342*     (2012.01)
    *D04H 1/587*     (2012.01)
    *D04H 1/64*     (2012.01)
    *B29K 79/00*     (2006.01)
    *B29K 105/08*     (2006.01)
    *B29L 31/30*     (2006.01)

(52) U.S. Cl.
    CPC .......... *B60R 13/08* (2013.01); *B60R 13/0838* (2013.01); *B60R 13/0876* (2013.01); *D04H 1/4342* (2013.01); *D04H 1/587* (2013.01); *D04H 1/64* (2013.01); *F02B 77/13* (2013.01); *B29K 2079/08* (2013.01); *B29K 2105/0854* (2013.01); *B29L 2031/30* (2013.01); *B32B 2305/20* (2013.01); *B32B 2377/00* (2013.01); *B32B 2605/00* (2013.01)

(58) Field of Classification Search
    CPC ........ D04H 1/4342; D04H 1/587; D04H 1/64; F02B 77/13; B29K 2105/0854; B29L 2031/30; B32B 37/14; B32B 2377/00; B32B 2305/20
    USPC ......................................................... 181/294
    See application file for complete search history.

(56) References Cited

U.S. PATENT DOCUMENTS

| | | | | |
|---|---|---|---|---|
| 8,607,926 | B2* | 12/2013 | Richardson, III | B64C 1/40 |
| | | | | 181/294 |
| 9,190,045 | B2* | 11/2015 | Kim | D04H 1/4242 |
| 9,805,707 | B2 | 10/2017 | Kim | |
| 2010/0038169 | A1* | 2/2010 | Lee | B32B 7/12 |
| | | | | 181/294 |
| 2010/0108437 | A1* | 5/2010 | Bayle | B60R 13/02 |
| | | | | 181/286 |
| 2010/0229517 | A1 | 9/2010 | Fujihara | |
| 2015/0090526 | A1* | 4/2015 | Sasaki | E04B 1/86 |
| | | | | 181/294 |
| 2015/0176279 | A1* | 6/2015 | Wiker | E04B 9/001 |
| | | | | 181/294 |
| 2015/0231951 | A1* | 8/2015 | Gandhi | B60J 5/0418 |
| | | | | 296/146.2 |
| 2015/0279345 | A1* | 10/2015 | Mathur | G10K 11/162 |
| | | | | 181/294 |
| 2016/0047119 | A1* | 2/2016 | Dollhopf | E04B 1/84 |
| | | | | 181/290 |

FOREIGN PATENT DOCUMENTS

| | | |
|---|---|---|
| EP | 2204484 A1 | 7/2010 |
| JP | 2002-287767 A | 10/2002 |
| JP | 2005-335279 A | 12/2005 |
| JP | 2006-138935 A | 6/2006 |
| JP | 2007-039826 A | 2/2007 |
| JP | 2007-138953 A | 6/2007 |
| JP | 2008-050611 A | 3/2008 |
| JP | 2012-144818 A | 8/2012 |
| KR | 2006-0111330 A | 10/2006 |
| RU | 2358246 C2 | 6/2009 |
| WO | 2005/019783 A1 | 3/2005 |
| WO | 2009054349 A1 | 4/2009 |
| WO | 2009/063723 A1 | 5/2009 |
| WO | 2011/055530 A1 | 5/2011 |

OTHER PUBLICATIONS

International Search Report—PCT/KR2014/001601, dated Mar. 18, 2014.

\* cited by examiner

SOUND ABSORBING AND INSULATING MATERIAL AND METHOD FOR MANUFACTURING THE SAME

CROSS-REFERENCE TO RELATED APPLICATIONS

This application claims, under 35 U.S.C. § 119, the priority of Korean Patent Application No. 10-2013-0159412, filed on Dec. 19, 2013, in the Korean Intellectual Property Office, the disclosure of which is incorporated herein by reference in its entirety.

BACKGROUND (a) Technical Field

The present invention relates to a sound absorbing and insulating material and a method for manufacturing the same. In particular, the present invention provides a sound absorbing and insulating material and a method of preparing the same by impregnating a polyimide binder into a nonwoven fabric formed of a heat-resistant fiber. The thus prepared sound absorbing and insulating material may obtain superior sound-absorbing property, flame retardancy, heat resistance and heat resistance and moldability. The sound absorbing and insulating material of the present invention may suitably be applied to a part at which a temperature from room temperature to about 300° C. may be maintained.

(b) Background Art

Noise is an unwanted side effect of industrial development and causes gradually more damages. Accordingly, various methods have been provided to prevent noise. As a way of such noise prevention, researches for developing new sound absorbing and insulating materials capable of arresting, absorbing or insulating sound have been conducted in various ways.

Representative industrial sectors requiring sound absorbing and insulating materials include electric appliances such as an air conditioner, a refrigerator, a washing machine, a lawn mower, and the like, transportation such as a vehicle, a ship, an airplane, and the like, construction materials such as a wall material, a flooring material, and the like, and so forth. The sound absorbing and insulating material may also be required in other various industrial fields. In general, the sound absorbing and insulating materials used in industries may require, in addition to good sound-absorbing property, reduced weight, flame retardancy, heat resistance and heat-insulating property, depending on their applications. Particularly, flame retardancy and heat resistance may be additionally required for sound absorbing and insulating materials, particularly when they are used in engines, exhaust systems, and the like where high temperature of 300° C. or greater is maintained. For example, an aramid fiber, a polyimide fiber and an oxidized polyacrylonitrile (oxi-PAN) fiber have been used for sound absorbing and insulating materials with superior heat resistance.

In addition, in order to provide functionalities such as flame retardancy, water repellency, and the like to a sound absorbing and insulating material, many sound absorbing materials made of a nonwoven fabric containing aramid fibers and a functional skin material may be stacked.

For example, Korean Patent Publication No. 2007-0033310 discloses a flame-retardant sound absorbing material wherein a nonwoven fabric layer in which a heat-resistant short aramid fiber and a short thermoplastic polyester fiber are bridged and a skin material layer formed of a wetlaid nonwoven fabric consisting of a short aramid fiber are stacked.

In addition, Japanese Patent Publication No. 2007-0039826 discloses a water-repellent sound absorbing material wherein a nonwoven fabric layer of a heat-resistant short aramid fiber or a blend of a short aramid fiber and a short thermoplastic polyester fiber and a skin material layer treated with a water repellent are stacked.

Further, Japanese Patent Publication No. 2007-0138953 discloses a heat-resistant sound absorbing material wherein a nonwoven fabric layer consisting of a heat-resistant aramid fiber and a skin material layer formed of a fiber sheet containing a heat-resistant aramid fiber are stacked.

However, because the sound absorbing materials described above have a structure wherein a skin material layer is laminated on one side of a nonwoven fabric to provide functionalities such as flame retardancy, water repellency and the like, a hot pressing process for integrating the nonwoven fabric layer and the skin material layer may be necessary. Consequently, the overall process is complicated and troublesome, and a flame retardant, a water repellent, and the like included as additives may produce toxic gases as a result of combustion during the hot pressing process. In addition, deformation of the internal structure of the nonwoven fabric that may occur during the hot pressing process can lead to deterioration of sound-absorbing property.

The description provided above as a related art of the present invention is just merely for helping understanding of the background of the present invention and should not be construed as being included in the related art known by those skilled in the art.

SUMMARY

In preferred aspects, the present invention provides a new sound absorbing and insulating material having superior sound-absorbing property, flame retardancy, heat resistance and heat-insulating property and moldability. The sound absorbing and insulating material may include a polyimide binder uniformly distributed and attached on the surface of the yarn fiber of a nonwoven fabric. The nonwoven fabric having irregular micro cavities with a complicated three-dimensional labyrinth structure may maintain the three-dimensional structure inside the nonwoven fabric by maintaining the micro cavities of the nonwoven fabric or further forming micro cavities with the impregnated binder. As such, the physical properties of the nonwoven fabric such as sound-absorbing property and moldability into a desired shape may be improved as curing the binder.

Accordingly, the present invention provides a sound absorbing and insulating material having superior sound-absorbing property, flame retardancy, heat resistance and heat-insulating property and including a polyimide binder impregnated into a nonwoven fabric made of a heat-resistant fiber.

The present invention also provides a method for manufacturing a sound absorbing and insulating material by immersing a nonwoven fabric formed of a heat-resistant fiber in a binder containing a monomer. In particular, the monomer may be included in the binder may be polymerized and converted into polyimide by performing polymerization and curing.

The present invention further provides a method for reducing noise by applying the sound absorbing and insulating material in a noise-generating device.

In one aspect, the present invention provides a sound absorbing and insulating material that may comprise: a nonwoven fabric comprising a yarn fiber and comprising an amount of about 30 to 100 wt % of a heat-resistant fiber based on the total weight of the nonwoven fabric; and a polyimide binder impregnated into the nonwoven fabric and present in the same layer as the nonwoven fabric. The polyimide binder may be impregnated on the surface of the yarn fiber of the nonwoven fabric and maintaining a three-dimensional structure inside the nonwoven fabric by maintaining or further forming micro cavities of the nonwoven fabric.

The term "binder", as used herein, refers to a resin or a polymeric material that can be polymerized or cured to form a polymeric matrix. The binder may be cured (polymerized) or partially cured upon curing process such as heating, UV radiation, electron beaming, chemical polymerization using additives and the like. Preferably, the binder of the present invention may contain polyamic acid that can be polymerized into polyimide upon heating. Preferably, the binder according to the present invention generally refers to a polyimide binder.

The term "micro cavity(cavities)", as used herein, refers to a space or vacancy formed inside a nonwoven fabric layer and formed by fibers and may be regularly or irregularly arranged inside the nonwoven fabric layer. Further, the micro cavities may be formed by any kinds of material inside the nonwoven fabric, whether inherently existed or subsequently added. The micro cavities also may be formed by a binder, a resin additive, or the like, without limitation. The micro cavities may be open to outside of the nonwoven fabric or be connected therebetween inside the nonwoven fabric layer. The micro cavities may include various shapes of internal cavities such as a pore, an open-ended or closed hole, a labyrinth, a channel, or the like. Size dimension (diameter or width) of the micro cavities may vary from several nanometer scale to hundreds micrometer scale, without limitation. In particular, the micro cavities may provide a resonance path of sound or noise, and further provide a sound absorbing property. The resonance path of a sound in the micro cavities may not be limited to a specific frequency of sound.

The polyimide binder may be distributed and attached on the surface of the yarn fiber of the nonwoven fabric. The "distributed" state as used herein refers to being contacted, spread or scattered on the surface of the yarn fibers as described above, without limitations in thickness, uniformity, coverage or other physical properties upon impregnation. For instance, the binder resin may be applied or provided on the surface of the yarn to cover the surficial area of about 30% or greater, of about 40% or greater, of about 50% or greater, of about 60% or greater, of about 70% or greater, of about 80% or greater, or of about 90% or greater.

The heat-resistant fiber may have a limiting oxygen index (LOI) of about 25% or greater and a heat resistance temperature of about 150° C. or greater.

The term "limiting oxygen index (LOI)" as used herein refers to a minimum concentration of oxygen, expressed as a percentage, that will support combustion of a polymer. The LOI can be measured by passing a mixture of oxygen and nitrogen over a burning specimen, and reducing the oxygen level until a critical level is reached. The LOI values for different plastics or polymers, for example, an aramid fiber, an oxidized polyacrylonitrile (oxi-PAN) fiber, a polyimide (PI) fiber, a polybenzimidazole (PBI) fiber, a polybenzoxazole (PBO) fiber, a metallic fiber, a carbon fiber, a glass fiber, a basalt fiber, a silica fiber, and a ceramic fiber, can be determined by standardized tests, such as the ISO 4589 and ASTM D2863

The heat-resistant fiber suitably may be one or more selected from a group consisting of an aramid fiber, an oxidized polyacrylonitrile (oxi-PAN) fiber, a polyimide (PI) fiber, a polybenzimidazole (PBI) fiber, a polybenzoxazole (PBO) fiber, a metallic fiber, a carbon fiber, a glass fiber, a basalt fiber, a silica fiber and a ceramic fiber.

Preferably, the heat-resistant fiber may be an aramid fiber or an oxidized polyacrylonitrile (oxi-PAN) fiber having a fineness of about 1 to 15 denier and a yarn length of about 20 to 100 mm.

The nonwoven fabric suitably may have a thickness of about 3 to 20 mm and a density of about 100 to 2000 g/m$^2$.

The polyimide binder suitably may a weight-average molecular weight of about 10,000 to 200,000 g/mol. Preferably, an amount of about 1 to 300 parts by weight of the polyimide binder is impregnated based on 100 parts by weight of the nonwoven fabric.

The sound absorbing and insulating material may be suitably molded to correspond to a three-dimensional shape of an object to which the sound absorbing and insulating material is applied.

The sound absorbing and insulating material may be suitably formed in a single layer or multiple layers.

The sound absorbing and insulating material may be used for a vehicle.

In another aspect, the present invention provides a method for manufacturing a sound absorbing and insulating material. The method may comprise steps of: a) immersing a nonwoven fabric comprising an amount of about 30 to 100 wt % of a heat-resistant fiber based on the total weight of the nonwoven fiber in a binder solution in which polyamic acid is dispersed to impregnate the nonwoven fabric with the polyamic acid; b) recovering the nonwoven fabric impregnated with the polyamic acid—from the binder solution; and c) curing the recovered nonwoven fabric.

In the step c), curing the recovered nonwoven fabric may include converting the polyamic acid into polyimide.

The method may further comprise after the step b), molding the nonwoven fabric impregnated with the polyamic acid—into a desired shape.

In addition, the step b) suitably may comprise steps of: taking out and compressing the nonwoven fabric impregnated with the polyamic acid at a pressure of about 1 to 20 kgf/cm$^2$, taking out the nonwoven fabric impregnated with the polyamic acid and evaporating a solvent by heating at a temperature of about 70 to 200° C., or taking out and compressing the polyamic acid-impregnated nonwoven fabric and evaporating a solvent under the said temperature and pressure conditions.

Preferably, the sound absorbing and insulating material may have an amount of about 1 to 300 parts by weight of the polyimide impregnated therein based on 100 parts by weight of the nonwoven fabric.

The heat-resistant fiber suitably may have a limiting oxygen index (LOI) of about 25% or greater and a heat resistance temperature of about 150° C. or greater.

The heat-resistant fiber may be one or more selected from a group consisting of an aramid fiber, an oxidized polyacrylonitrile (oxi-PAN) fiber, a polyimide (PI) fiber, a polybenzimidazole (PBI) fiber, a polybenzoxazole (PBO) fiber, a metallic fiber, a carbon fiber, a glass fiber, a basalt fiber, a silica fiber and a ceramic fiber.

Preferably, the heat-resistant fiber may be an aramid fiber or an oxidized polyacrylonitrile (oxi-PAN) fiber having a fineness of about 1 to 15 denier and a yarn length of 20 to 100 mm.

The nonwoven fabric suitably may have a thickness of about 3 to 20 mm and a density of about 100 to 2000 g/m$^2$.

The nonwoven fabric may be formed by steps comprising: continuously performing up-down needling, down-up needling and up-down needling. Preferably, the nonwoven fabric may be formed with a needle stroke of about 30 to 350 times/m$^2$.

Preferably, the polyimide has a weight-average molecular weight of about 20,000 to 300,000 g/mol.

The binder solution may comprise an amount of about 1 to 60 wt % of the polyamic acid based on the total weight of the binder solution.

The sound absorbing and insulating material thus produced may be used for a vehicle.

In another aspect, the present invention provides a method for reducing noise of a noise-generating device, and the method may comprise steps of: i) checking a three-dimensional shape of a noise-generating device; ii) preparing and molding a sound absorbing and insulating material so as to correspond to the three-dimensional shape of the device partially or entirely; and iii) bringing the sound absorbing and insulating material adjacent to the noise-generating device.

The term "partially" as used herein covers a portion of surface from the total surface of a device. For example, the partially corresponding molded material may cover 10% or less, 20% or less, 30% or less, 40% or less, 50% or less, 60% or less, 70% or less, 80% or less, 90% or less, or 95% or less from the total structure or surface of a device.

Preferably, the noise-generating device may be a vehicle part, such as a motor, an engine or an exhaust system where a high temperature condition is maintained.

The sound absorbing and insulating material may be brought adjacent to the noise-generating device by attaching the sound absorbing and insulating material to the noise-generating device, providing the sound absorbing and insulating material with a distance from the noise-generating device, or molding the sound absorbing and insulating material as a part of the noise-generating device.

Further provided is a vehicle that comprises the sound absorbing and insulating material as described herein.

Other aspects of the invention are disclosed infra.

The sound absorbing and insulating material of the present invention may include the polyimide binder as being impregnated into the nonwoven fabric comprising a heat-resistant fiber such that the sound absorbing and insulating material may have superior sound-absorbing property, flame retardancy, heat resistance and heat-insulating property. Further, the sound absorbing and insulating material can be shaped into a desired three-dimensional shape due to the curable polyimide binder.

In addition, the sound absorbing and insulating material of the present invention may not need a hot pressing process for integrating a nonwoven fabric with a skin material unlike the conventional sound absorbing and insulating material that may have a stacked structure.

Further, because the sound absorbing and insulating material may be prepared by further including a functional additive in the binder solution, such a process of stack a skin material to provide functionality to the sound absorbing and insulating material may not be necessary.

Further, since the sound absorbing and insulating material has superior flame retardancy, heat resistance and heat-insulating property in addition to sound-absorbing property, the sound absorbing and insulating material may not be deformed or denatured even when used in a noise-generating device maintained at high temperatures of 300° C. or greater.

Further, the sound absorbing and insulating material may be molded into a desired shape in the state as the polyamic acid may be impregnated and cured.

In addition, a nonwoven fabric formed of a heat-resistant fiber may be used, as such, thermal deformation of the nonwoven fabric due to the reaction heat of thermal curing may not occur even when the thermosetting resin polyimide is used as the binder.

Accordingly, the sound absorbing and insulating material of the present invention is useful as a sound absorbing and insulating material in applications requiring arresting, absorbing or insulating of sound, including electric appliances such as an air conditioner, a refrigerator, a washing machine, a lawn mower and the like, transportation such as a vehicle, a ship, an airplane and the like, construction materials such as a wall material, a flooring material, and the like, and so forth.

The sound absorbing and insulating material of the present invention may be used in a noise-generating device where high temperature of 300° C. or greater is maintained. In particular, when the sound absorbing and insulating material of the present invention is used in a vehicle, it may be closely attached to a noise-generating device of the automobile such as an engine, an exhaust system, and the like, as being provided with a distance from the noise-generating device or being molded as a part of the noise-generating device.

BRIEF DESCRIPTION OF DRAWINGS

The above and other objects, features and advantages of the present invention will be more clearly understood from the following detailed description taken in conjunction with the accompanying drawing, in which:

FIG. 1A is an image of an exemplary nonwoven fabric before impregnation of a binder, FIG. 1B is an image of an exemplary nonwoven fabric in which about 20 parts by weight of a binder is impregnated based on 100 parts by weight of the nonwoven fabric, and FIG. 1C is an image of an exemplary nonwoven fabric in which about 50 parts by weight of a binder is impregnated based on 100 parts by weight of the nonwoven fabric.

FIG. 2A is an image of a sound absorbing and insulating material molded for use in an exemplary vehicle engine, and FIG. 2B shows an example wherein a sound absorbing and insulating material is applied in a part of an exemplary vehicle engine.

FIG. 3A shows an exemplary sound absorbing and insulating material molded for use in a lower part of a vehicle, and FIG. 3B shows an exemplary sound absorbing and insulating material attached to a lower part of a vehicle.

DETAILED DESCRIPTION

Figure 1A:
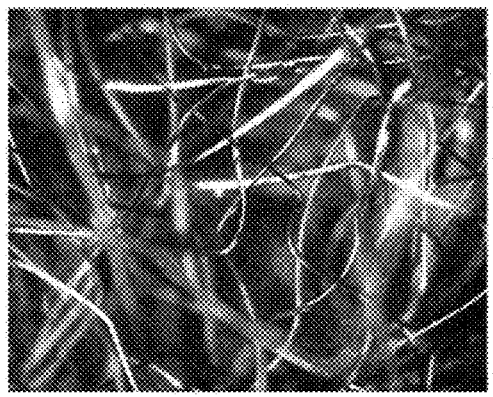
FIGS. 1A-1C show electron microscopic images (×300) of an exemplary nonwoven fabric before and after impregnation of a binder.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention relates to a sound absorbing and insulating material and a method for manufacturing same. The sound absorbing and insulating material of the present invention may have superior sound-absorbing property, flame retardancy, heat resistance and heat-insulating property and may be moldable into a desired three-dimensional shape using a binder as being impregnated or present in the same layer as a heat-resistant fiber nonwoven fabric.

In an aspect, the present invention provides a sound absorbing and insulating material including: a nonwoven fabric comprising a yarn fiber and comprising an amount of about 30 to 100 wt % of a heat-resistant fiber based on the total weight of the nonwoven fabric; and a polyimide binder impregnated into the nonwoven fabric and present in the same layer as the nonwoven fabric. The polyimide binder suitably may be distributed and attached on the surface of the yarn fiber of the nonwoven fabric and may maintain the three-dimensional structure inside the nonwoven fabric by maintaining or further forming micro cavities of the nonwoven fabric.

In an exemplary embodiment of the present invention, the heat-resistant fiber may have a limiting oxygen index (LOI) of 25% or greater and a heat resistance temperature of 150° C. or greater, particularly of about 300° C. or greater.

In an exemplary embodiment of the present invention, the heat-resistant fiber may be one or more selected from a group consisting of an aramid fiber, oxidized polyacrylonitrile (oxi-PAN) fiber, a polyimide (PI) fiber, a polybenzimidazole (PBI) fiber, a polybenzoxazole (PBO) fiber, a metallic fiber, a carbon fiber, a glass fiber, a basalt fiber, a silica fiber and a ceramic fiber.

In another exemplary embodiment of the present invention, the heat-resistant fiber may be an aramid fiber or an oxidized polyacrylonitrile (oxi-PAN) fiber having a fineness of about 1 to 15 denier and a yarn length of about 20 to 100 mm.

In an exemplary embodiment of the present invention, the nonwoven fabric may have a thickness of about 3 to 20 mm and a density of about 100 to 2000 g/m$^2$.

In another exemplary embodiment of the present invention, the nonwoven fabric may have a density of about 200 to 1200 g/m$^2$.

In an exemplary embodiment of the present invention, the nonwoven fabric may be impregnated with a polyimide binder having a weight-average molecular weight of about 10,000 to 200,000.

In another exemplary embodiment of the present invention, an amount of about 1-300 parts by weight of the polyimide binder may be impregnated based on 100 parts by weight of the nonwoven fabric.

In an exemplary embodiment of the present invention, the sound absorbing and insulating material may be molded to correspond to a three-dimensional shape of an object to which the sound absorbing and insulating material is applied.

In an exemplary embodiment of the present invention, the sound absorbing and insulating material may be formed as a single layer or multiple layers.

In another exemplary embodiment of the present invention, the sound absorbing and insulating material may be used as a sound absorbing and insulating material for a vehicle.

Figure 1B:
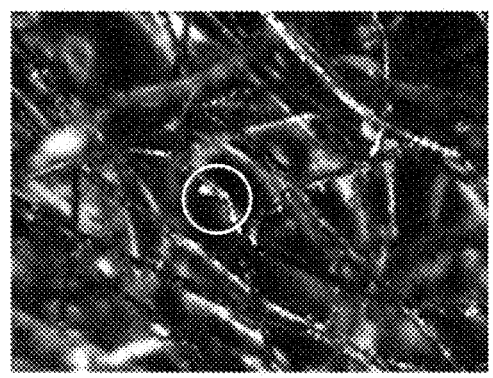
Figure 1C:
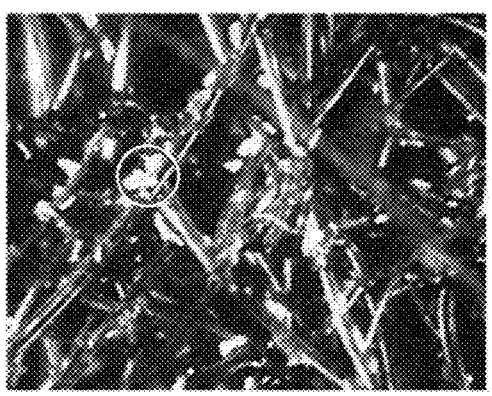

The structure of the sound absorbing and insulating material according to the present invention is described in more detail referring to FIGS. 1A-1C.

FIGS. 1A-1C show electron microscopic images showing the three-dimensional shape inside a nonwoven fabric before and after impregnation of a polyimide binder.

FIG. 1A is an electron microscopic image showing the internal structure of an exemplary nonwoven fabric before impregnation of a polyimide binder. It can be seen that heat-resistant fiber yarns cross each other to form irregular micro cavities. FIG. 1B and FIG. 1C are electron microscopic images after impregnation of a polyimide binder into the nonwoven fabric. It can be seen that the binder is finely and uniformly distributed and attached to the heat-resistant fiber yarns. Further, it can be seen that the content of the binder on the yarn surface increases as the content of the binder increases.

Although there may be differences depending on the preparation method, fibers are randomly arranged three-dimensionally in a nonwoven fabric. Accordingly, the pore structure inside a nonwoven fabric may be a very complicated labyrinth structure (labyrinth system) as regularly or irregularly arranged fibers are three-dimensionally interconnected rather than bundles of independent capillary tubes. That is to say, the nonwoven fabric used in the present invention may have irregular micro cavities formed as the yarns formed of the heat-resistant fiber loosely cross each other.

When a polyimide binder is impregnated into the nonwoven fabric, the polyimide may be finely and uniformly impregnated (distributed and attached) to the surface of the yarn fiber of the nonwoven fabric, thereby forming much finer micro cavities than before the impregnation. The formation of fine micro cavities in the internal structure of the nonwoven fabric means increased resonance of noise and thus improved sound-absorbing property. In particular, because the three-dimensional network structure of polyimide may be formed by curing of polyamic acid, the sound-absorbing property may be further improved since more numbers of the fine micro cavities can be formed inside the nonwoven fabric.

Accordingly, the nonwoven fabric may maintain the intrinsic three-dimensional structure as the polyimide binder is uniformly impregnated into the nonwoven fabric. Additionally, since more numbers of the fine micro cavities can be formed as the polyamic acid prepolymer is polymerized or converted to the polyimide by curing, the sound absorbing and insulating material of the present invention may have remarkably improved sound-absorbing performance due to the maximized noise absorption through increased resonance in the nonwoven fabric.

As seen from the electron microscopic images of FIGS. 1A-1C, in the sound absorbing and insulating material of the present invention, the polyimide binder may be uniformly dispersed and distributed on the surface of the heat-resistant fiber yarns constituting the nonwoven fabric.

Hereinafter, the components of the sound absorbing and insulating material according to the present invention having the internal structure described above are described in more detail.

In the present invention, a heat-resistant fiber may be used as the main fiber component constituting the nonwoven fabric.

The heat-resistant fiber may include any one having superior durability and capable of enduring high-temperature and ultrahigh-temperature conditions. Preferably, the heat-resistant fiber may be one having a limiting oxygen index (LOI) of about 25% or greater and a heat resistance temperature of about 150° C. or greater. In particular, the heat-resistant fiber may be one having a limiting oxygen index (LOI) of about 25 to 80% and a heat resistance temperature of about 300 to 30000° C. Further, in particular, the heat-resistant fiber may be one having a limiting oxygen index (LOI) of about 25 to 70% and a heat resistance temperature of about 300 to 1000° C.

The heat-resistant fiber suitably may have a fineness of about 1 to 15 denier, or particular of about 1 to 6 denier and a yarn length of about 20 to 100 mm, or particularly of about 40 to 80 mm. When the yarn length is less than the predetermined range, for example, less than about 20 mm, the binding strength of the nonwoven may deteriorate because of difficulty in yarn bridging during needle punching. When the yarn length is greater than the predetermined range, for example, greater than about 100 mm, the yarn may not be transferred as desired during carding although the nonwoven may have good binding strength.

The heat-resistant fiber may be a 'super fiber' as commonly known in the related art. The heat-resistant super fiber suitably may be one or more selected from a group consisting of an aramid fiber, an oxidized polyacrylonitrile (oxi-PAN) fiber, a polyimide (PI) fiber, a polybenzimidazole (PBI) fiber, a polybenzoxazole (PBO) fiber, a metallic fiber, a carbon fiber, a glass fiber, a basalt fiber, a silica fiber, a ceramic fiber, and the like.

Preferably, an aramid fiber or an oxidized polyacrylonitrile (oxi-PAN) fiber may be used as the heat-resistant fiber in the present invention.

In the present invention, the polyimide binder is impregnated into the nonwoven fabric and present in the same layer as the nonwoven fabric so as to maintain the three-dimensional structure inside the nonwoven fabric. To 'maintain the three-dimensional structure inside the nonwoven fabric' means that the binder may be impregnated into the nonwoven fabric and uniformly distributed and attached on the surface of the yarn fibers of the nonwoven fabric, thereby maintaining the three-dimensional structure inside the nonwoven fabric by maintaining the micro cavities of the nonwoven fabric or further forming micro cavities.

In general, a binder refers to a material used for adhesion or bonding of two materials. Without limitation, in the present invention, the binder refers to a material impregnated into a nonwoven fabric formed of a heat-resistant fiber.

In the present invention, polyimide may be used as a binder impregnated into the nonwoven fabric. A general synthetic process of polyimide is shown in the following Scheme 1. According to the preparation method of Scheme 1, polyamic acid represented by the following Chemical Formula 3 may be prepared by polymerizing an acid dianhydride monomer represented by the following Chemical Formula 1 and a diamine monomer represented by the following Chemical Formula 2. Then, polyimide represented by the following Chemical Formula 4 may be prepared by converting the polyamic acid through imidization.

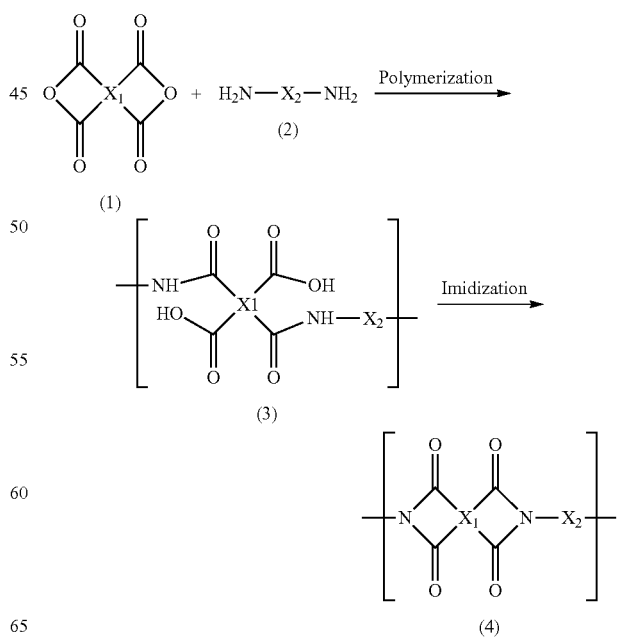

In Scheme 1, $X_1$ is a tetravalent aliphatic or aromatic hydrocarbon group and $X_2$ is a divalent aliphatic or aromatic hydrocarbon group.
In Scheme 1, $X_1$ is a tetravalent group derived from an acid dianhydride monomer and specific examples are as follows:
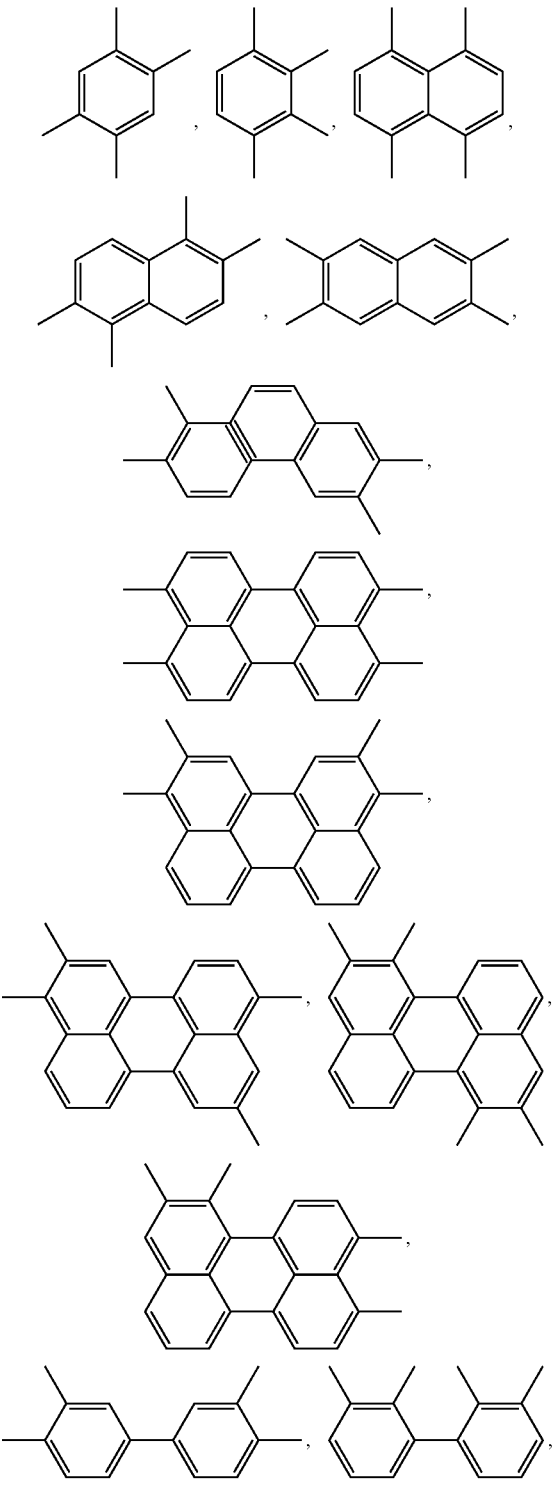
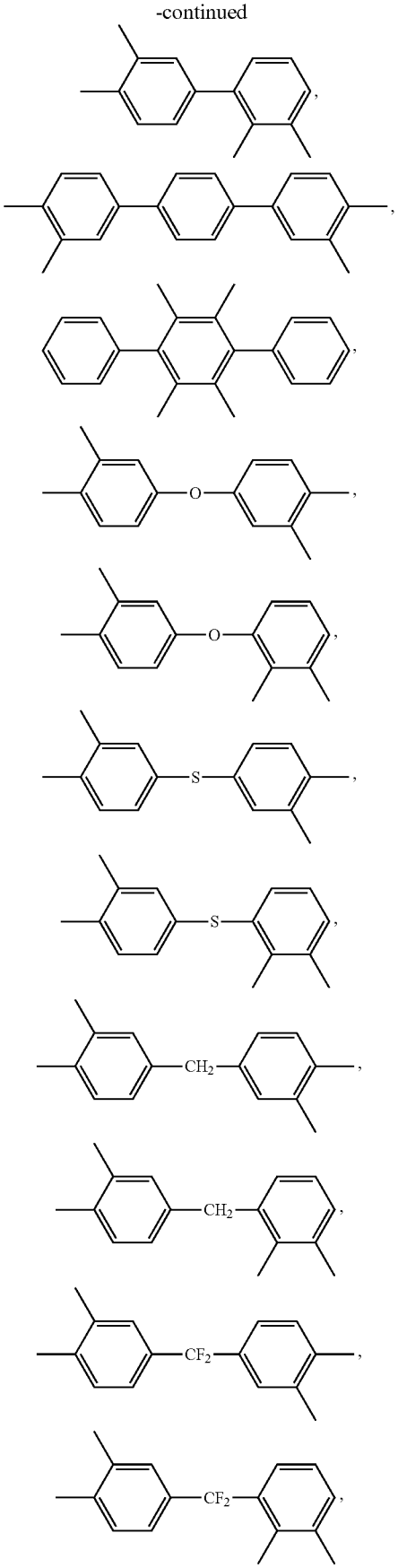

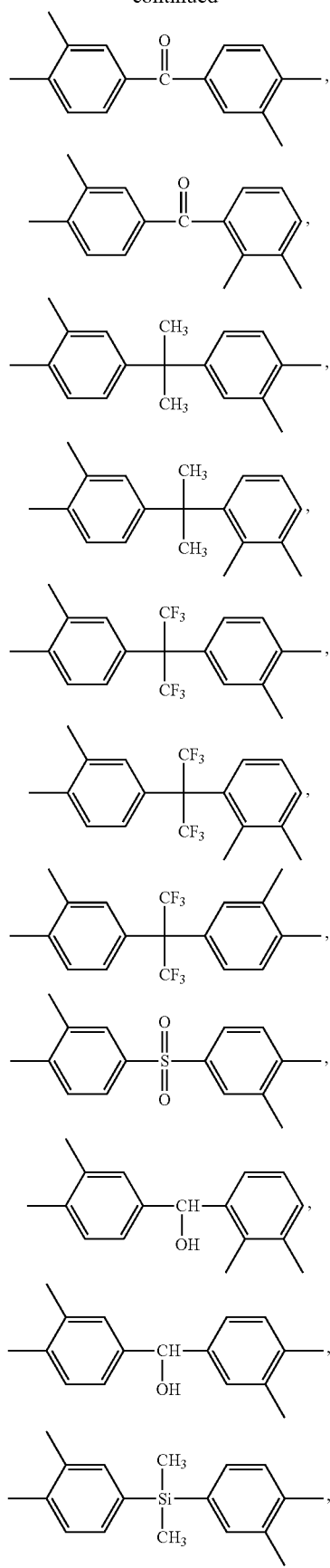
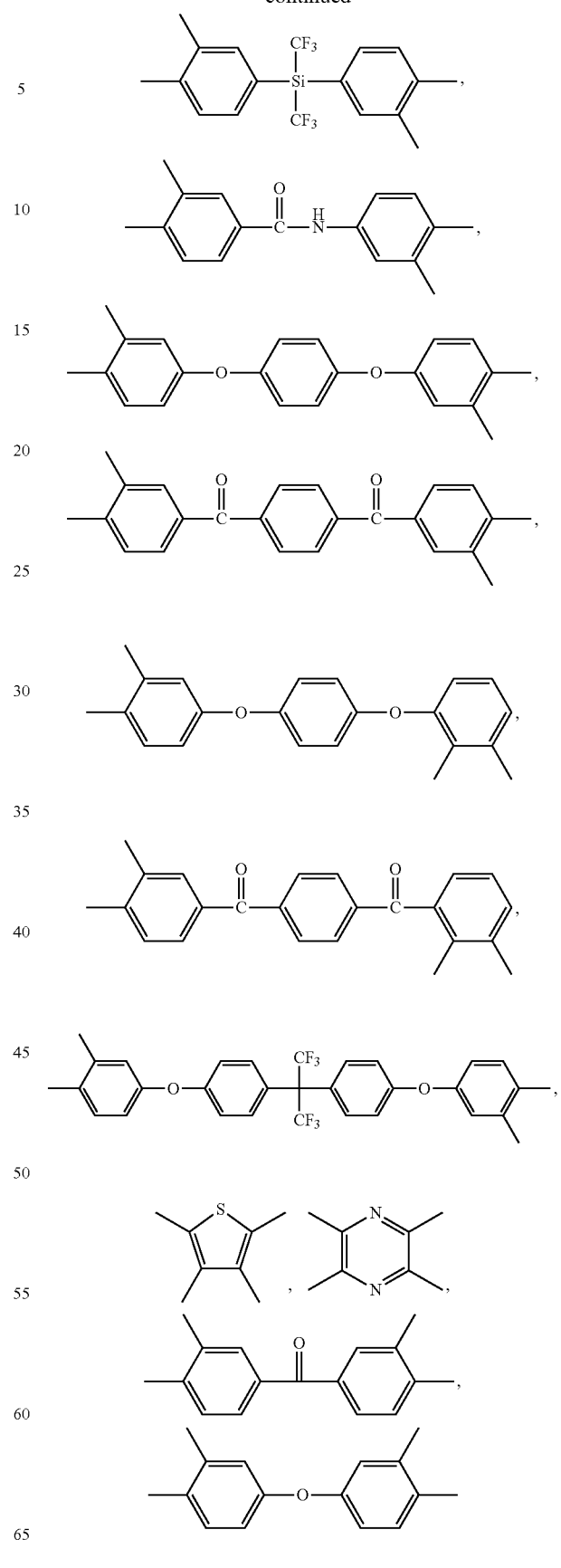

Further, in Scheme 1, $X_2$ is a divalent derived from a diamine monomer and specific examples are as follows:
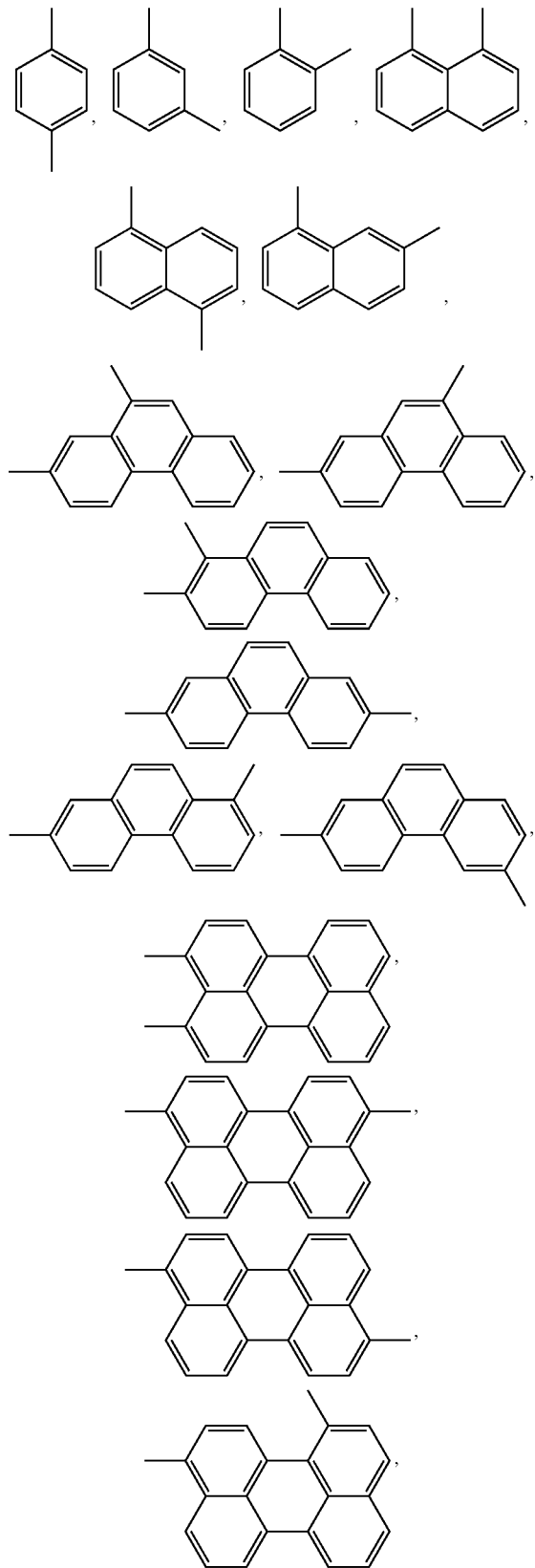
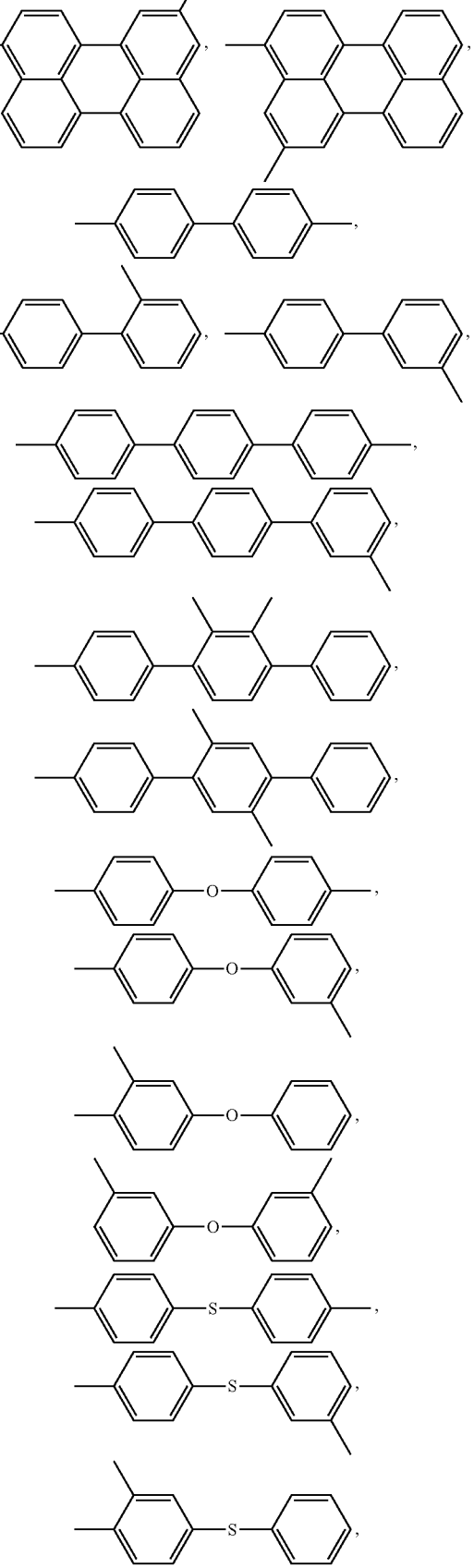

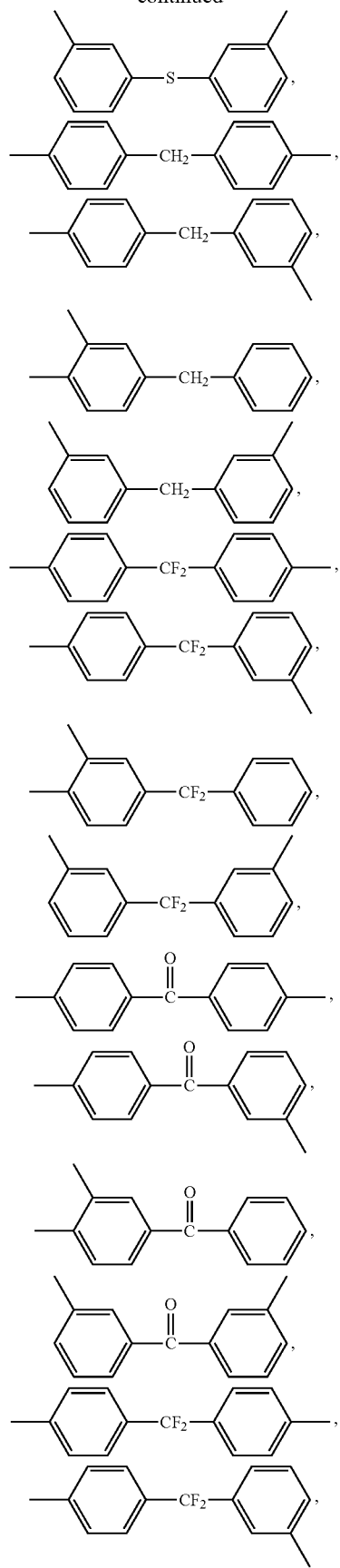
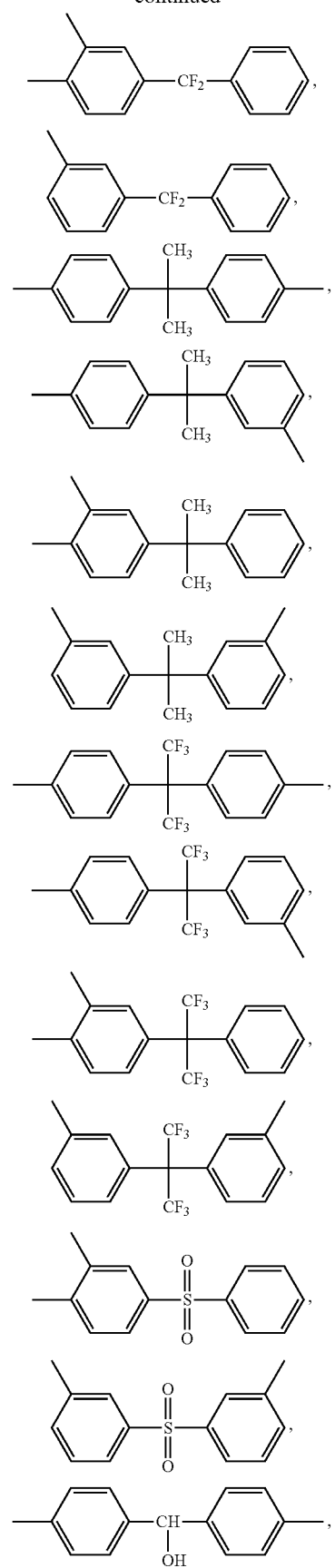

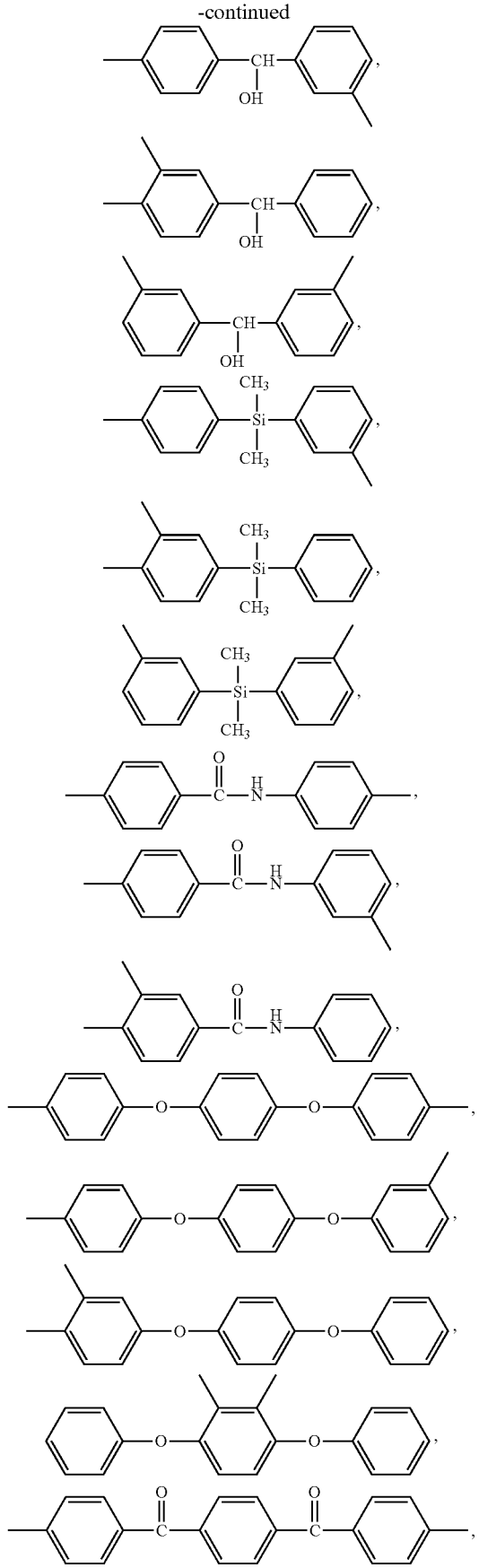

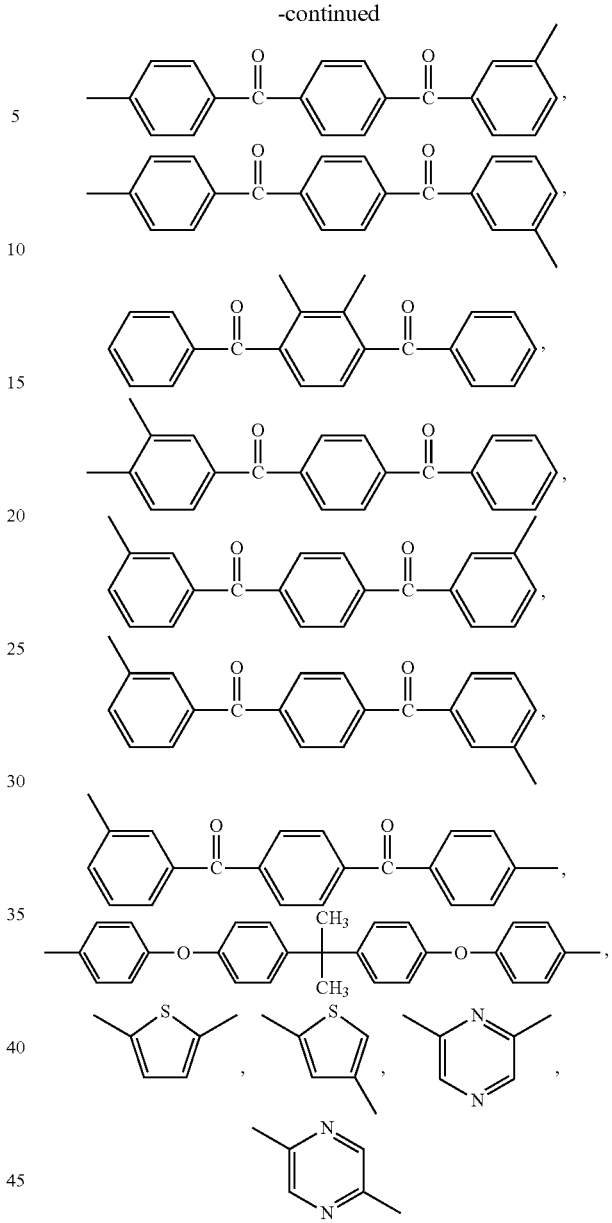

The polyimide used as the binder in the present invention may be a curing product prepared from imidization of the polyamic acid. The cured polyimide has a three-dimensional network structure. Accordingly, as the polyamic acid in the internal structure of the nonwoven fabric is cured to polyimide, the polyimide binder spontaneously may form a network structure and generates further micro cavities. As a result, more numbers of fine micro cavities may be formed inside the nonwoven fabric and sound-absorbing performance may be improved further.

In addition, the polyimide may be a representative thermosetting resin and may have entirely different physical and chemical properties from a thermoplastic heat-resistant fiber as used in a nonwoven fabric such as an aramid fiber or an oxidized polyacrylonitrile (oxi-PAN) fiber. As such, when the thermosetting polyimide binder is impregnated into the nonwoven fabric formed of the thermoplastic heat-resistant fiber, an interfacial layer may be formed between them due to edge-to-edge contact because of the difference in characteristics. As a result, the micro cavities of the nonwoven fabric may remain open. That is to say, when the polyimide is impregnated into the nonwoven fabric formed of the heat-resistant fiber, it is possible to maintain the three-dimensional structure inside the nonwoven fabric.

Furthermore, the polyimide may be curable with light, heat or a curing agent and its shape may not deformed even at high temperatures. Accordingly, when the polyimide is impregnated into the nonwoven fabric, the shape of the molded nonwoven fabric may be maintained even at high temperatures.

Accordingly, the sound absorbing and insulating material according to the present invention in which the polyimide binder is impregnated into the nonwoven fabric may have improved sound-absorbing performance because the three-dimensional structure inside the nonwoven fabric can be maintained as more numbers of fine micro cavities are formed or maintained inside the nonwoven fabric. In addition, it can be molded into a desired shape when the binder in the nonwoven fabric is cured and the molded shape can be maintained even at high temperatures.

The polyimide used as the binder in the present invention may be prepared by the common preparation method according to Scheme 1. The present invention is not particularly limited in the preparation method of the polyimide.

A general polyimide preparation method according to Scheme 1 is described in detail.

First, polyamic acid may be prepared through condensation polymerization of an acid dianhydride monomer and a diamine monomer. The condensation polymerization may be performed by a commonly employed polymerization method using monomers commonly known in the art.

The acid dianhydride monomer suitably may include an aliphatic or aromatic tetracarboxylic dianhydride. In particular, the acid dianhydride monomer may include 1,2,3,4-cyclobutanetetracarboxylic dianhydride, 1,2,3,4-cyclopentanetetracarboxylic dianhydride, 5-(2,5-dioxotetrahydrofuryl)-3-methyl-3-cyclohexene-1,2-dicarboxylic anhydride, 4-(2,5-dioxotetrahydrofuran-3-yl)-tetralin-1,2-dicarboxylic anhydride, bicylooctene-2,3,5,6-tetracarboxylic dianhydride, pyromellitic dianhydride, 3,3',4,4'-biphenyl-tetracarboxylic dianhydride, 2,2-bis(2,3-dicarboxyphenyl)-1,1,1,3,3,3-hexafluoropropane dianhydride, 2,2-bis(3,4-dicarboxyphenyl)-1,1,1,3,3,3-hexafluoropropane dianhydride, 3,3',4,4'-benzophenonetetracarboxylic dianhydride, bis(3,4-dicarboxyphenyl) ether dianhydride, bis(3,4-dicarboxyphenyl)sulfone dianhydride, and the like. The acid dianhydride monomer may be used alone or in combination of two or more and the scope of the present invention is not limited to these monomers.

The diamine monomer suitably may include an aliphatic or aromatic diamino compound. In particular, the diamine monomer may include m-phenylenediamine, p-phenylenediamine, 3,4'-diaminodiphenyl ether, 4,4'-diaminodiphenyl ether, 4,4'-diaminodiphenylsulfone, 3,3'-diaminodiphenylsulfone, 2,2-bis(4-aminophenoxyphenyl)propane, 2,2-bis(4-aminophenoxyphenyl)-hexafluoropropane, 1,3-bis(4-aminophenoxy)benzene, 1,4-bis(4-aminophenoxy)benzene, 2,4-diaminotoluene, 2,6-diaminotoluene, diaminodiphenylmethane, 4,4'-diamino-2,2-dimethylbiphenyl, 2,2-bis(trifluoromethyl)-4,4'-diaminobiphenyl, and the like. The diamine monomer may be used alone or in combination of two or more and the scope of the present invention is not limited to these monomers.

The polymerization for preparing the polyamic acid may be conducted at a temperature of about 0 to 90° C. for about 1 to 24 hours using a common organic solvent. As the organic solvent, a polar solvent such as m-cresol, N-methyl-2-pyrrolidone, N-ethyl-2-pyrrolidone, N,N-dimethylacetamide, N,N-dimethylformamide, dimethyl sulfoxide, and the like. may be used.

Then, the polyamic acid may be converted to polyimide through imidization. The imidization reaction may be performed by a commonly employed curing method using light, heat or a curing agent. Preferably, the curing reaction may be conducted by heat-treating at a temperature of about 150 to 350° C. If necessary, an acid catalyst such as p-toluenesulfonic acid, hydroxybenzoic acid, crotonic acid, and the like or a base catalyst such as an organic amine, an organic azole, and the like may be used as an imidization catalyst to facilitate the curing.

The polyimide used as the binder in the present invention may be a common aliphatic or aromatic polyimide resin and may have a weight-average molecular weight of about 10,000 to 200,000. When the weight-average molecular weight of the polyimide binder is less than about 10,000, polymer properties may be unsatisfactory. When it is greater than about 200,000, impregnation may be difficult because the polyimide binder may not be dissolved well in a solvent.

In addition, various additives, e.g., a flame retardant, a heat resistance improver, a water repellent, and the like may be used to provide functionalities to the sound absorbing and insulating material. Because the additive is included in the binder solution, additional skin material for providing functionalities to the sound absorbing and insulating material may not be necessary.

The flame retardant may be melamine, a phosphate, a metal hydroxide, and the like. Preferably, one or more selected from a group consisting of melamine, melamine cyanurate, melamine polyphosphate, phosphazene, ammonium polyphosphate, and the like may be used as the flame retardant. Particularly, the flame retardant may be melamine, which may enhance flame retardancy and heat resistance at the same time.

The heat resistance improver suitably may include alumina, silica, talc, clay, glass powder, glass fiber, metal powder, and the like.

One or more fluorine-based water repellent may be used as the water repellent.

In addition, additives commonly used in the art may be selected and used depending on purposes.

In another aspect, the present invention provides a method for manufacturing a sound absorbing and insulating material. The method may comprise steps of: a) immersing a nonwoven fabric containing an amount of about 30 to 100 wt % of a heat-resistant fiber based on the total weight of the nonwoven fabric in a binder solution in which polyamic acid is dispersed; b) recovering the polyamic acid-impregnated nonwoven fabric from the binder solution; and c) curing the recovered nonwoven fabric by converting the polyamic acid to polyimide. In particular, in the step a), the nonwoven fabric may be impregnated with the polyamic acid in the binder solution.

In an exemplary embodiment of the present invention, the method may further include, after the step b) of recovering the nonwoven fabric, b-1) molding nonwoven fabric impregnated with the polyamic acid into a desired shape.

In an exemplary embodiment of the present invention, the step b) of recovering the nonwoven fabric may include steps of: taking out and compressing the polyamic acid-impregnated nonwoven fabric at a pressure of about 1 to 20 $kgf/cm^2$, a process of taking out the polyamic acid-impregnated nonwoven fabric and evaporating a solvent by heating at a temperature of about 70 to 200° C. or alternatively, a process of taking out and compressing the polyamic acid-impregnated nonwoven fabric and evaporating a solvent under the above-described conditions.

In an exemplary embodiment of the present invention, the step c) of polymerizing the polyamic acid to polyimide may include a curing process of converting the polyamic acid to polyimide through imidization at a temperature of about 150 to 350° C.

Hereinafter, the steps of the method for manufacturing a sound absorbing and insulating material according to the present invention are described in detail.

In the step a), a nonwoven fabric formed of a heat-resistant fiber may be immersed in a binder solution.

In the present invention, the nonwoven fabric may be immersed in the binder solution so as to improve sound-absorbing and sound-insulating performance and to allow molding of the sound absorbing and insulating material into a desired shape.

In the binder solution into which the nonwoven fabric is immersed, polyamic acid as a precursor of polyimide may be dispersed. In the binder solution, polyamic acid obtained from polymerization of an acid dianhydride monomer and a diamine monomer may be dispersed. The monomers, common additives and solvent used in the polymerization of the polyamic acid are the same as described above.

In the present invention, the degree of impregnation into the nonwoven fabric may be controlled with the concentration of the binder solution. The binder solution may include an amount of about 1 to 60 wt %, or particularly of about 5 to 30 wt % of the polyamic acid based on the total weight of the binder solution. When the amount of the polyamic acid in the binder solution is less than about the predetermined amount, for example, less than about 1 wt % low, the effect desired by the present invention may not be achieved because the amount of the binder impregnated into the nonwoven fabric is small. When the amount of the polyamic acid in the binder solution is greater than the predetermined amount, greater than about 60 wt %, the nonwoven fabric may become too hard to function as a sound absorbing and insulating material.

The binder solution in which the polyamic acid is dispersed may contain one or more commonly used additive selected from a group consisting of a flame retardant, a heat resistance improver, and a water repellent, and the like. The amount of these additives may be adjusted adequately depending on purposes. When the addition amount is less than the predetermined amount, the desired effect of addition may not be achieved. And, excessive amount may be economically unfavorable and cause undesired side effects.

In the step b), the polyamic acid-impregnated nonwoven fabric may be recovered from the binder solution.

In the present invention, the step of recovering the nonwoven fabric may include a step of taking out the nonwoven fabric immersed in the binder solution and removing a solvent. This process may be performed under application of adequate heat and pressure. For example, the step of recovering the nonwoven fabric may include a process of taking out the polyamic acid-impregnated nonwoven fabric and controlling the content of the binder in the nonwoven fabric by compressing at a pressure of about 1 to 20 kgf/cm$^2$. The step of recovering the nonwoven fabric may also include a process of taking out the polyamic acid-impregnated nonwoven fabric and evaporating a solvent by heating at a temperature of about 70 to 200° C. In addition, the step of recovering the nonwoven fabric may include a process of taking out and compressing the polyamic acid-impregnated nonwoven fabric at a pressure of about 1 to 20 kgf/cm$^2$ and then evaporating a solvent by heating at a temperature of about 70 to 200° C.

The content of the binder included in the nonwoven fabric recovered from the binder solution may be an important factor determining the size, shape and distribution of micro cavities inside the sound absorbing and insulating material. Accordingly, the sound-absorbing property and mechanical property of the sound absorbing and insulating material may be controlled therewith. The final content of the polyimide binder included in the sound absorbing and insulating material according to the present invention may be controlled to be an amount of about 1 to 300 parts by weight, or particularly of about 30 to 150 parts by weight, based on 100 parts by weight of the nonwoven fabric.

In the step c), the polyamic acid may be converted to polyimide.

In particular, in the step c), the polyamic acid included in the recovered nonwoven fabric may be converted to polyimide through curing. The curing process for conversion to polyimide may be performed using light, heat or a curing agent and conditions for the process of converting the polyamic acid to polyimide are well known in the art. When the conversion to polyimide is performed through thermal curing, it may be performed at a temperature of about 150 to 350° C. for about 30 minutes to 3 hours.

After the step c), it can be confirmed from an electron microscopic image that the polyimide is uniformly distributed and attached to the yarn surface of the nonwoven fabric. The polyimide impregnated into the nonwoven fabric may have a weight-average molecular weight of about 10,000 to 200,000 g/mol.

In the present invention, the method for manufacturing a sound absorbing and insulating material may further include, after the step b) of recovering the nonwoven fabric, b-1) a step of molding the nonwoven fabric into a sound absorbing and insulating material of a desired shape.

Particularly, the method for manufacturing a sound absorbing and insulating material including the molding step b-1) may include steps of: a) immersing a nonwoven fabric comprising an amount of about 30-100 wt % of a heat-resistant fiber based on the total weight of the nonwoven fiber in a binder solution in which polyamic acid is dispersed; b) recovering the nonwoven fabric impregnated with the polyamic acid from the binder solution; b-1) molding the nonwoven fabric into a desired shape; and c) curing the recovered nonwoven fabric by converting the polyamic acid to polyimide.

The molding step b-1) may be performed by heat-treating at high temperature. The molding process at high temperature, which also considers the curing reaction of the thermosetting binder, may be performed at a temperature of about 150 to 350° C., or particularly at a temperature of about 200 to 300° C.

The method for manufacturing a sound absorbing and insulating material may further include, before the step a), a-1) forming a nonwoven fabric by a needle punching process using a heat-resistant fiber. For example, in the step a-1), an aramid nonwoven fabric having a thickness of about 3 to 20 mm may be formed by a needle punching process of a heat-resistant aramid fiber having a fineness of about 1 to 15 denier.

For example, the method for manufacturing a sound absorbing and insulating material according to the present invention including the step a-1) may include: a-1) forming a nonwoven fabric by a needle punching process using a heat-resistant fiber; a) immersing the nonwoven fabric comprising an amount of about 30 to 100 wt % of a heat-resistant fiber based on the total weight of the nonwoven fiber in a binder solution in which polyamic acid is dispersed; b) recovering the nonwoven fabric impregnated with the polyamic acid—from the binder solution; b-1) molding the nonwoven fabric into a desired shape; and c) curing the recovered nonwoven fabric by converting the polyamic acid to polyimide.

The step a-1) of forming the nonwoven fabric may include a needle punching process using a heat-resistant fiber. The sound-absorbing property may vary depending on the thickness and density of the nonwoven fabric. It is expected that the sound-absorbing property will improve as the thickness and density of the nonwoven fabric are increased.

The nonwoven fabric used in the present invention may have a thickness of about 3 to 20 mm when considering the industrial field and the like where the sound absorbing and insulating material is used. When the thickness of the nonwoven fabric is less than about 3 mm, the durability and moldability of the sound absorbing and insulating material may be unsatisfactory. When the thickness is greater than about 20 mm, productivity may decrease and production cost may increase. Further, the density of the nonwoven fabric may be of about 100 to 2000 $g/m^2$, preferably of about 200 to 1200 $g/m^2$, more preferably of about 300 to 800 $g/m^2$, when considering performance and cost.

The nonwoven fabric may be formed by stacking a web of about 30 to 100 $g/m^2$ formed by carding 2- to 12-fold and continuously performing up-down preneedling, down-up needling and up-down needling, thereby forming physical bridges that provide the necessary thickness, binding strength and other desired physical properties. The needle used to perform the needling may be a barb-type needle, having a working blade of about 0.5 to 3 mm and a needle length (the distance from crank outside to point) of about 70- to 120 mm. Preferably, the needle stroke may be performed at about 30 to 350 times/$m^2$.

More preferably, the fineness of yarn for the nonwoven fabric may be about 1.5 to 8.0 denier, the thickness of the pile layer may be about 6 to 13 mm, the needle stroke may be about 120 to 250 times/$m^2$, and the density of the nonwoven fabric may be about 300 to 800 $g/m^2$.

The internal structure of the sound absorbing and insulating material manufactured by the method described above may be confirmed using an electron microscope. When observed with an electron microscope, the sound absorbing and insulating material of the present invention may have micro cavities having a size of about 1 to 100 μm distributed inside thereof. The micro cavities are distributed regularly or irregularly with a spacing of about 0.1 to 500 μm.

In another aspect, the present invention provides a method for reducing noise of a noise-generating device. The method may comprise: i) checking a three-dimensional shape of a noise-generating device; ii) preparing and molding a sound absorbing and insulating material so as to correspond to the three-dimensional shape of the device partially or entirely; and iii) bringing the sound absorbing and insulating material adjacent to the noise-generating device.

The device refers to a noise-generating device including a motor, an engine, an exhaust system, and the like. However, the scope of the device is never limited to the motor, engine and exhaust system. The sound absorbing and insulating material may be manufactured to correspond to the three-dimensional shape of the device partially or entirely. Since the sound absorbing and insulating material of the present invention is moldable during curing of the binder, the sound absorbing and insulating material may be molded to correspond to the three-dimensional shape of the device partially or entirely.

The expression "adjacent" means closely attaching the sound absorbing and insulating material to the noise-generating device, providing it with a distance from the noise-generating device, or molding it as a part of the noise-generating device. The expression adjacent also includes mounting the sound absorbing and insulating material to a member connected to the noise-generating device (e.g., another sound absorbing and insulating material).

FIGS. 2A-2B and FIGS. 3A-3B schematically show representative examples wherein the sound absorbing and insulating material of the present invention is applied to a noise-generating device of a vehicle.

Figure 2A:
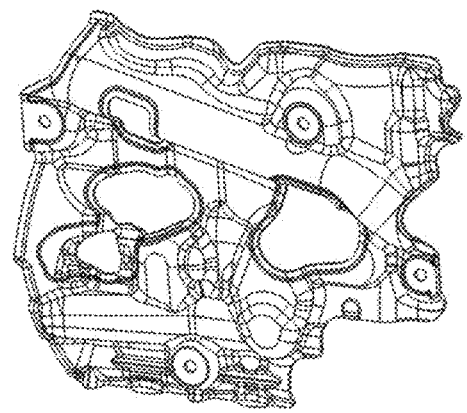
FIGS. 2A-2B schematically show an example of a sound absorbing and insulating material applied to an exemplary noise-generating device of a vehicle after molding as a part.
Figure 2B:
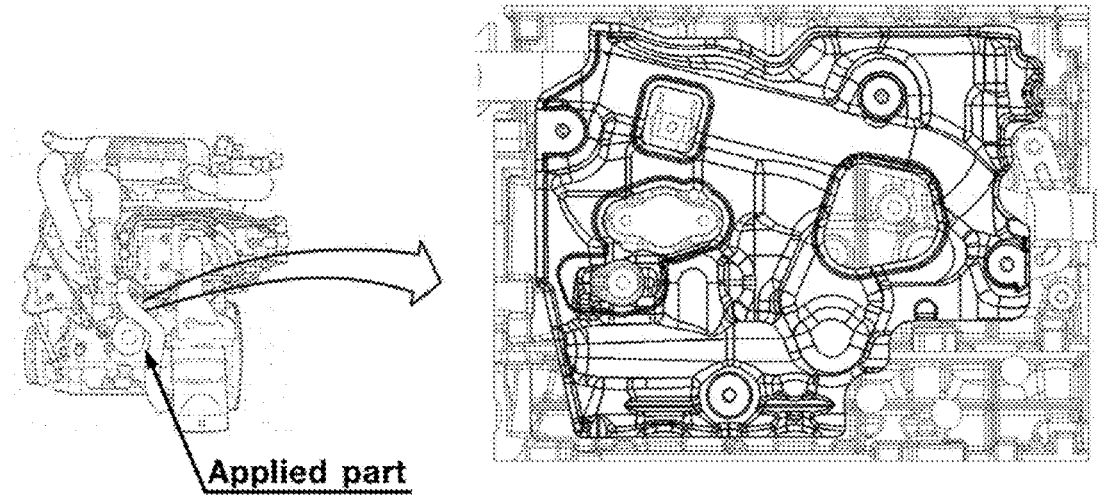

FIGS. 2A-2B schematically show an exemplary sound absorbing and insulating material that is molded as a part and applied to a noise-generating device of a vehicle. FIG. 2A shows an exemplary sound absorbing and insulating material molded to be used in a vehicle engine, and FIG. 2B shows an exemplary sound absorbing and insulating that may be applied in a part of a vehicle engine.

Figure 3A:
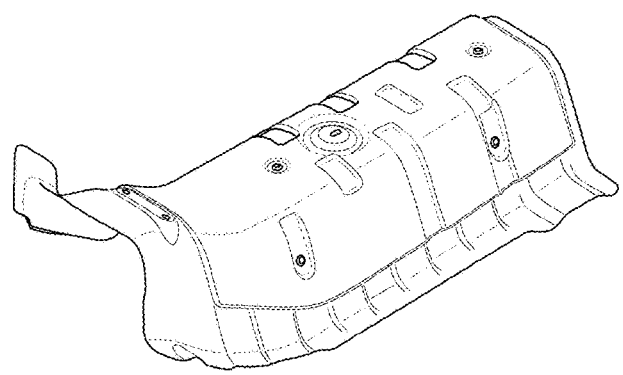
FIGS. 3A-3B schematically show an example wherein a sound absorbing and insulating material is applied to an exemplary noise-generating device of a vehicle with some distance.
Figure 3B:
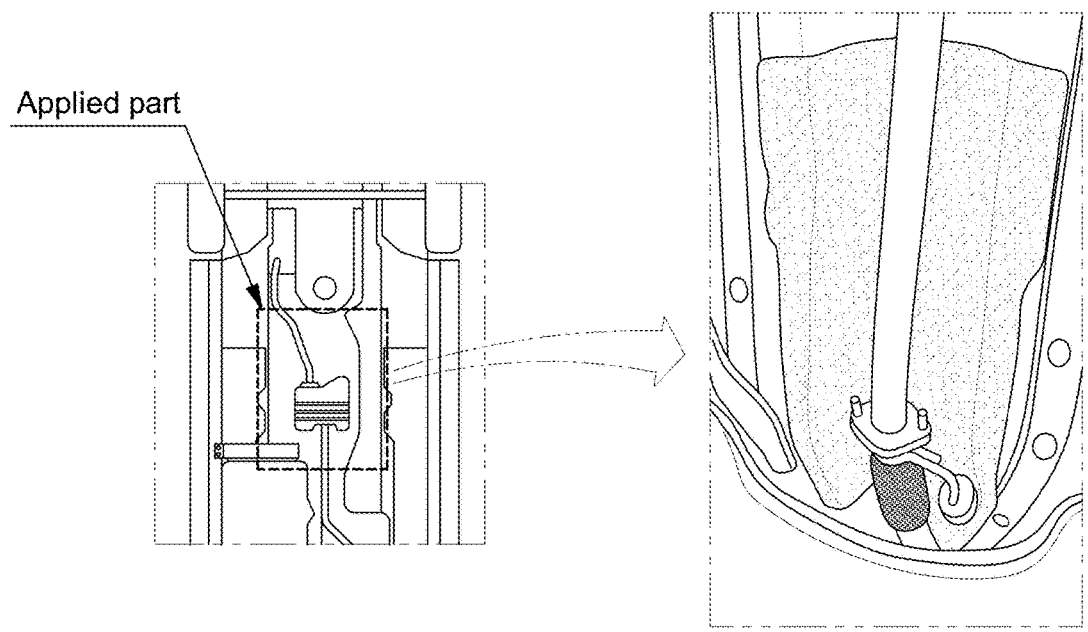

FIGS. 3A-3B schematically shows an exemplary sound absorbing and insulating material that may be applied to a noise-generating device of a vehicle. FIG. 3A shows an exemplary sound absorbing and insulating material molded to be used in a lower part of the vehicle, and FIG. 3B shows an exemplary sound absorbing and insulating material attached to a lower part of the vehicle.

As described above, the sound absorbing and insulating material of the present invention may include the polyimide binder as being impregnated to maintain the three-dimensional structure inside the nonwoven fabric and thus, may have superior sound-absorbing property, flame retardancy, heat resistance and heat-insulating property. Accordingly, it can exhibit the desired sound-absorbing performance as directly applied to a noise-generating device maintained at high temperatures of about 200° C. or greater, as well as at room temperature, without deformation.

EXAMPLES

Hereinafter, the present invention is described in more detail through examples. However, the scope of the present invention is not limited by the examples.

Preparation of Sound Absorbing and Insulating Material

Example 1. Preparation of Sound Absorbing and Insulating Material Using Polyimide Resin-Impregnated Aramid Nonwoven Fabric A short aramid fiber having a limiting oxygen index (LOI) of 40% and a heat resistance temperature of 300° C. was air blown and formed into a web of 30 $g/m^2$ through carding. The web was stacked by overlapping 10-fold on a conveyor belt operated at 5 m/min using a horizontal wrapper. An aramid nonwoven fabric having a density of 300 $g/m^2$ and a thickness of 6 mm was prepared by continuously performing up-down needling, down-up needling and up-down needling with a needle stroke of 150 times/$m^2$.

The prepared nonwoven fabric was immersed in a binder solution. The binder solution was a solution in which a polyamic acid prepolymer polymerized from pyromellitic dianhydride and 4,4-oxydianiline is dispersed in an N-methyl-2-pyrrolidone solvent at a concentration of 15 wt % based on the total weight of the binder solution.

The nonwoven fabric was taken out from the binder solution and compressed using a roller at a pressure of 8 kgf/cm$^2$. As a result, a polyamic acid-impregnated nonwoven fabric having a density of 1,500 g/m$^2$ was obtained.

The polyamic acid-impregnated nonwoven fabric was molded into a desired shape by curing at a temperature of 200° C. for 2 minutes. Then, a sound absorbing and insulating material wherein a polyimide represented by Chemical Formula 5 is impregnated in the aramid nonwoven fabric was prepared by imidizing the polyamic acid at a temperature of 300° C.

[Chemical Formula 5]

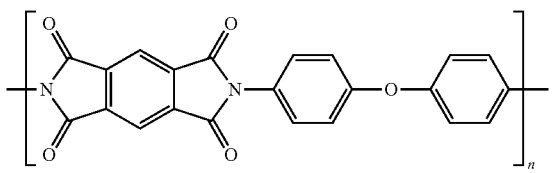

The polyimide represented by Chemical Formula 5 impregnated into the nonwoven fabric has a weight-average molecular weight of 20,000 g/mol and the final content of the polyimide was 50 parts by weight based on 100 parts by weight of the nonwoven fabric.

Comparative Example 1. Preparation of Sound Absorbing and Insulating Material Using Aramid Nonwoven Fabric An aramid nonwoven fabric having a density of 300 g/m$^2$ and a thickness of 6 mm was prepared by needle punching as described in Example 1 for use as a sound absorbing and insulating material.

Comparative Example 2. Preparation of Sound Absorbing and Insulating Material Using Polyimide Resin-Coated Aramid Nonwoven Fabric An aramid nonwoven fabric having a density of 300 g/m$^2$ and a thickness of 6 mm was prepared by needle punching as described in Example 1. A solution containing a polyimide resin was coated on the surface of the nonwoven fabric and a sound absorbing and insulating material was prepared by drying and molding the nonwoven fabric at a temperature of 150° C. The coating amount was 50 parts by weight based on 100 parts by weight of the nonwoven fabric.

Comparative Example 3. Preparation of Sound Absorbing and Insulating Material Using Thermoplastic Resin-Impregnated Aramid Nonwoven Fabric An aramid nonwoven fabric having a density of 300 g/m$^2$ and a thickness of 6 mm was prepared by needle punching as described in Example 1. The nonwoven fabric was immersed in a binder solution, dried and then molded for use as a sound absorbing and insulating material.

The binder solution was a thermoplastic resin solution containing 10 wt % of polyethylene (PE) resin, 10 wt % of melamine cyanurate and 80 wt % of dimethyl carbonate (DMC) based on the total weight of the binder solution.

Comparative Example 4. Preparation of Sound Absorbing and Insulating Material Using Polyimide Resin-Impregnated PET Nonwoven Fabric A polyethylene terephthalate (PET) nonwoven fabric having a density of 300 g/m$^2$ and a thickness of 6 mm was prepared by needle punching as described in Example 1. The nonwoven fabric was immersed in a binder solution, dried and then molded for use as a sound absorbing and insulating material.

The PET nonwoven fabric prepared in Comparative Example 4 was thermally deformed due to the reaction heat produced during the curing of polyimide and could not be molded into a desired shape because it was completely thermally deformed during the drying and thermal molding processes.

Testing Method: Evaluation of Physical Properties of Sound Absorbing and Insulating Materials The physical properties of the sound absorbing and insulating materials were measured and compared as follows.

1. Evaluation of Heat Resistance

To evaluate heat resistance, the sound absorbing and insulating material was aged in an oven at a temperature of 300° C. for 300 hours. After keeping at standard state (temperature 23±2° C., 50±5% relative humidity) for at least 1 hour, appearance was inspected and tensile strength was measured. It was visually inspected whether there were shrinkage or deformation, surface peeling, fluffing and cracking. The tensile strength was measured using a dumbbell-type No. 1 for randomly selected five sheets of test samples at a speed of 200 mm/min under a standard condition.

2. Evaluation of Thermal Cycle

The durability of the sound absorbing and insulating material was evaluated by the thermal cycle test method. The durability was determined after performing five cycles under the following conditions.

1) Condition of One Cycle

Room temperature→high temperature (150° C.×3 hr)→room temperature→low temperature (−30° C.×3 hr)→room temperature→humid condition (50° C.×95% RH).

2) Durability Evaluation Standard

After the thermal cycle test, the change in appearance was inspected. For example, surface damage, swelling, breaking and discoloring were inspected. If there was no change in appearance, the sound absorbing and insulating material was evaluated as 'no abnormality'.

3. Evaluation of Flame Retardancy

The flame retardancy of the sound absorbing and insulating material was measured according to the ISO 3795 flammability test method.

4. Evaluation of Nonflammability

The nonflammability of the sound absorbing and insulating material was measured according to the UL94 vertical burn test.

5. Evaluation of Sound-Absorbing Property

The sound-absorbing property of the sound absorbing and insulating material was measured according to the ISO 354 method.

6. Evaluation of Air Permeability

1) Evaluation Method

The test sample was mounted on a Frazier-type tester and the amount of air flowing through the sample vertically was measured. The area of the test sample through which the air passed was 5 cm$^2$ and the applied pressure was set to 125 pascal (Pa).

Test Example 1. Comparison of Properties of Sound Absorbing and Insulating Materials Depending on Heat-Resistant Fibers In Test Example 1, the physical properties of sound absorbing and insulating materials prepared with different heat-resistant fiber yarns were compared. Nonwoven fabrics having a density of 300 g/m² and a thickness of 6 mm were prepared by needle punching as described in Example 1 using the fiber yarns described in Table 1. Then, sound absorbing and insulating materials were prepared by immersing the nonwoven fabrics in binder solutions in which polyamic acid was dispersed and performing imidization after taking them out from the binder solutions.

The physical properties of the prepared sound absorbing and insulating materials were measured as described above. The result of measuring the properties of the sound absorbing and insulating materials prepared with different heat-resistant fibers is shown in Table 2.

TABLE 1

|  |  | Yarn 1 | Yarn 2 | Yarn 3 | Yarn 4 | Yarn 5 |
|---|---|---|---|---|---|---|
| Yarns | Yarn material | Aramid | PI | PBI | PBO | oxi-PAN |
|  | Limiting oxygen index | 40 | 50 | 40 | 60 | 65 |
|  | Heat resistance temperature (° C. × 1 hr) | 300 | 300 | 300 | 300 | 300 |
| Heat resistance | Appearance | No abnormality | No abnormality | No abnormality | No abnormality | No abnormality |
|  | Tensile strength (Kgf/cm²) | 200 | 220 | 200 | 210 | 210 |
| Thermal cycle | Appearance | No abnormality | No abnormality | No abnormality | No abnormality | No abnormality |
| Flame retardancy |  | Self-extinguishing | Self-extinguishing | Self-extinguishing | Self-extinguishing | Self-extinguishing |
| Nonflammability |  | Nonflammable | Nonflammable | Nonflammable | Nonflammable | Nonflammable |

TABLE 2

| | Sound-absorbing rate | | | | |
|---|---|---|---|---|---|
| Frequency (Hz) | Yarn 1 (aramid) | Yarn 2 (PI) | Yarn 3 (PBI) | Yarn 4 (PBO) | Yarn 5 (oxi-PAN) |
| 400 | 0.08 | 0.06 | 0.07 | 0.08 | 0.08 |
| 500 | 0.10 | 0.08 | 0.08 | 0.10 | 0.09 |
| 630 | 0.16 | 0.15 | 0.14 | 0.14 | 0.13 |
| 800 | 0.23 | 0.20 | 0.22 | 0.21 | 0.22 |
| 1000 | 0.35 | 0.29 | 0.30 | 0.34 | 0.35 |
| 1250 | 0.44 | 0.39 | 0.33 | 0.40 | 0.45 |
| 1600 | 0.59 | 0.50 | 0.49 | 0.53 | 0.57 |
| 2000 | 0.70 | 0.69 | 0.70 | 0.69 | 0.68 |
| 2500 | 0.79 | 0.75 | 0.77 | 0.74 | 0.80 |
| 3150 | 0.83 | 0.80 | 0.82 | 0.84 | 0.85 |
| 4000 | 0.86 | 0.82 | 0.85 | 0.87 | 0.88 |
| 5000 | 0.99 | 0.89 | 0.92 | 0.91 | 0.92 |
| 6300 | 0.98 | 0.93 | 0.94 | 0.94 | 0.98 |
| 8000 | 0.99 | 0.98 | 0.98 | 0.98 | 0.89 |
| 10000 | 0.98 | 0.98 | 0.99 | 0.98 | 0.99 |

As seen from Table 1 and Table 2, all the sound absorbing and insulating materials prepared using heat-resistant fibers having a limiting oxygen index of 25% or greater and a heat resistance temperature of 150° C. or greater as presented by the present invention exhibited satisfactory heat resistance, durability, flame retardancy, nonflammability and sound-absorbing property. Accordingly, it was confirmed that common heat-resistant fibers known as super fiber can be used as the material of the nonwoven fabric of the sound absorbing and insulating material according to the present invention.

Test Example 2. Comparison of Properties of Sound Absorbing and Insulating Materials Depending on Density of Nonwoven Fabric In Test Example 2, polyimide-impregnated sound absorbing and insulating materials were prepared in the same manner as in Example 1 using nonwoven fabrics having different densities. The sound-absorbing performance of the prepared sound absorbing and insulating materials is shown in FIG. 4.

Figure 4:
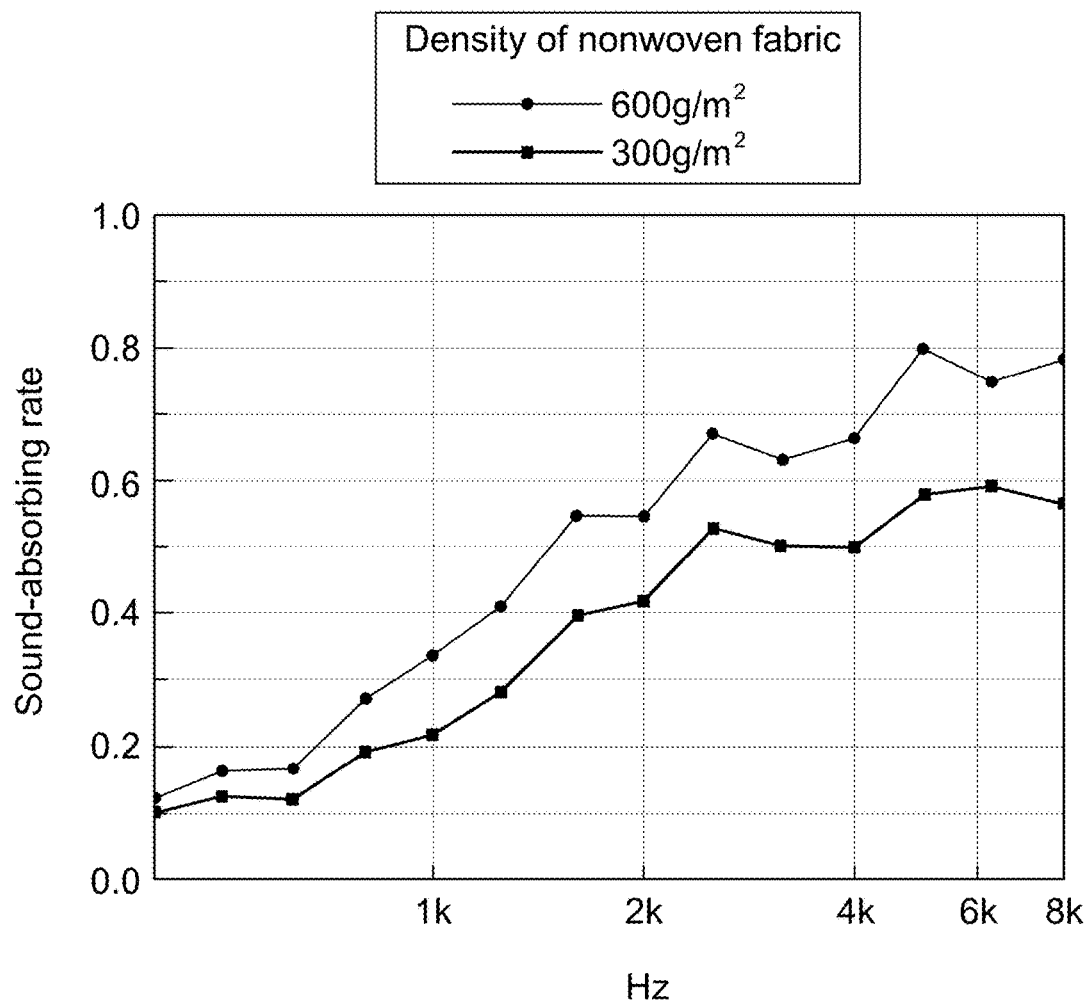
FIG. 4 is a graph comparing the sound-absorbing performance of an exemplary sound absorbing and insulating material depending on the density of a nonwoven fabric.

As seen from FIG. 4, the sound-absorbing performance of the sound absorbing and insulating material was superior when a nonwoven fabric having a density of 600 g/m² was used than when a nonwoven fabric having a density of 300 g/m² was used.

Test Example 3. Evaluation of Physical Properties of Sound Absorbing and Insulating Materials In Test Example 3, the properties of sound absorbing and insulating materials depending on the method by which a binder was applied to a nonwoven fabric formed of a heat-resistant fiber were compared.

That is to say, the sound-absorbing rate of the sound absorbing and insulating materials prepared by impregnating (Example 1) and coating (Comparative Example 2) the polyimide (PI) binder into the aramid nonwoven fabric was compared. The result of measuring the sound-absorbing rate of the sound absorbing and insulating material formed of an aramid nonwoven fabric (Comparative Example 1), the sound absorbing and insulating material formed of an aramid nonwoven fabric on which PI was coated (Comparative Example 2) and the sound absorbing and insulating material formed of an aramid nonwoven fabric into which PI was impregnated (Example 1) is shown in Table 3.

TABLE 3

| | Sound-absorbing rate | | |
|---|---|---|---|
| Frequency (Hz) | Comparative Example 1 (nonwoven fabric) | Comparative Example 2 (PI-coated nonwoven fabric) | Example 1 (PI-impregnated nonwoven fabric) |
| 400 | 0.01 | 0.01 | 0.04 |
| 500 | 0.03 | 0.03 | 0.08 |

TABLE 3-continued

| | Sound-absorbing rate | | |
|---|---|---|---|
| Frequency (Hz) | Comparative Example 1 (nonwoven fabric) | Comparative Example 2 (PI-coated nonwoven fabric) | Example 1 (PI-impregnated nonwoven fabric) |
| 630 | 0.12 | 0.06 | 0.16 |
| 800 | 0.16 | 0.09 | 0.23 |
| 1000 | 0.26 | 0.22 | 0.34 |
| 1250 | 0.32 | 0.19 | 0.38 |
| 1600 | 0.39 | 0.27 | 0.52 |
| 2000 | 0.48 | 0.29 | 0.66 |
| 2500 | 0.64 | 0.44 | 0.78 |
| 3150 | 0.63 | 0.50 | 0.82 |
| 4000 | 0.72 | 0.70 | 0.86 |
| 5000 | 0.80 | 0.77 | 0.89 |
| 6300 | 0.78 | 0.79 | 0.98 |
| 8000 | 0.89 | 0.89 | 0.98 |
| 10000 | 0.90 | 0.96 | 0.98 |

As seen from Table 3, the sound absorbing and insulating material of Example 1 according to the present invention showed superior sound-absorbing rate in all frequency ranges as compared to the sound absorbing and insulating material of Comparative Example 1 wherein the nonwoven fabric not containing PI was used. In contrast, the sound absorbing and insulating material of Comparative Example 2 wherein the PI-coated nonwoven fabric was used showed lower sound-absorbing rate than the nonwoven fabric (Comparative Example 1) in the frequency range of 400-5000 Hz.

Test Example 4. Evaluation of Heat-Insulating Performance of Sound Absorbing and Insulating Materials In Test Example 4, the heat-insulating performance of the sound absorbing and insulating materials prepared in Example 1 (PI-impregnated aramid nonwoven fabric), Comparative Example 1 (aramid nonwoven fabric) and Comparative Example 3 (PE-impregnated aramid nonwoven fabric) was evaluated. After applying heat at a temperature of 1000° C. from one side of a 25-mm thick sample of each sound absorbing and insulating material for 5 minutes, temperature was measured on the opposite side of the sample.

The temperature measured on the opposite side of the sound absorbing and insulating material was at a temperature of 250° C. for the sound absorbing and insulating material of Example 1 and at a temperature of 350° C. for the sound absorbing and insulating material of Comparative Example 1. Accordingly, it was confirmed that the sound absorbing and insulating material of the present invention wherein the thermosetting resin was impregnated exhibits improved heat-insulating performance. In contrast, the thermoplastic resin-impregnated sound absorbing and insulating material of Comparative Example 3 melted down and deformed as soon as the heat at a temperature of 1000° C. was applied.

Accordingly, it can be seen that the sound absorbing and insulating material of the present invention has very superior heat-insulating property.

Test Example 5. Comparison of Heat-Insulating Performance with Aluminum Heat-Insulating Plate In Test Example 5, the heat-insulating performance of the sound absorbing and insulating material of Example 1 was compared with that of an aluminum heat-insulating plate. While applying the same heat from one side of the sound absorbing and insulating material and the heat-insulating plate at a temperature of 250° C., the temperature at the opposite side was measured with time. The result is shown in FIG. 5.

Figure 5:
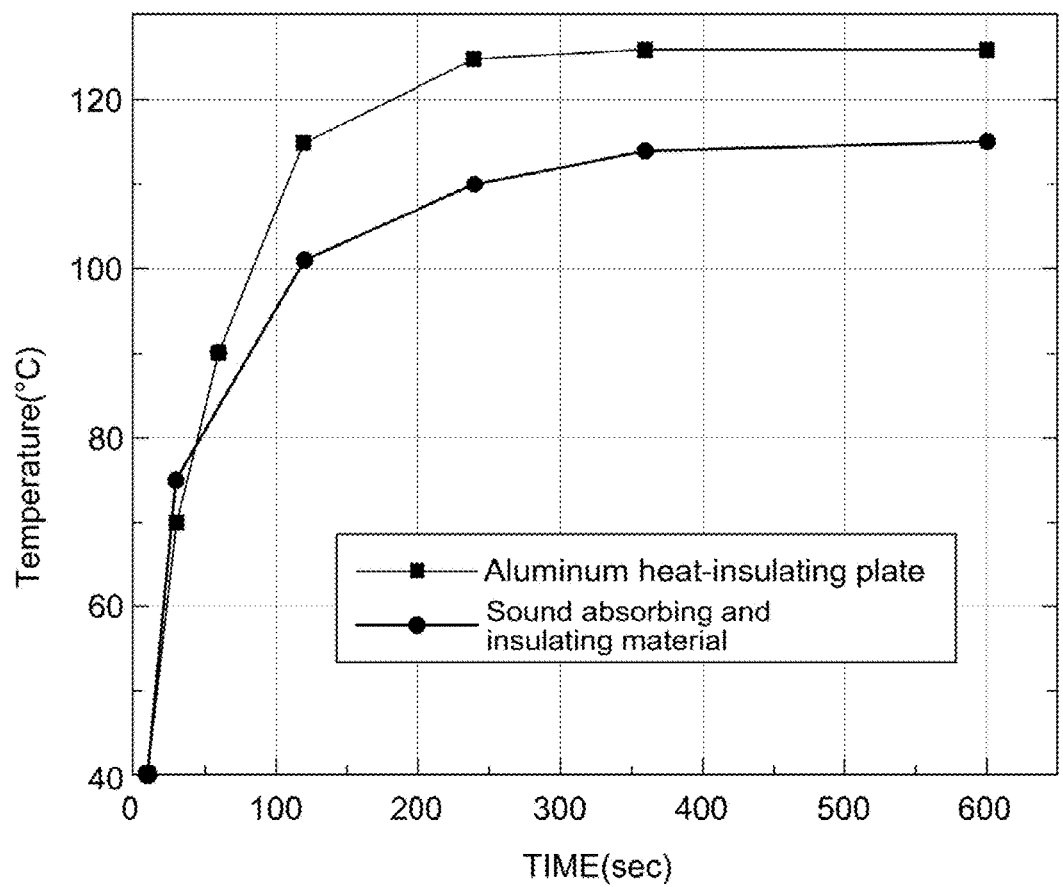
FIG. 5 is a graph comparing the heat-insulating performance of an aluminum heat-insulating plate with that of an exemplary sound absorbing and insulating material of the present invention.

As seen from FIG. 5, the sound absorbing and insulating material according to the present invention showed better heat-insulating performance with the heat resistance temperature at least 11° C. lower as compared to the aluminum heat-insulating plate.

Test Example 6. Comparison of Properties of Sound Absorbing and Insulating Material Depending on Binder Content Sound absorbing and insulating materials were prepared in the same manner as in Example 1. The nonwoven fabric taken out from the binder solution was compressed and dried to have different final binder contents. The binder content was represented as parts by weight of the binder contained in the sound absorbing and insulating material based on 100 parts by weight of the dried nonwoven fabric.

The result of comparing the mechanical properties and sound-absorbing rate of the sound absorbing and insulating materials prepared with different binder contents is shown in Table 4 and Table 5.

TABLE 4

| | Physical properties of sound absorbing and insulating materials with different PI binder contents | | | | |
|---|---|---|---|---|---|
| | Binder content (parts by weight) | | | | |
| | 0 | 10 | 50 | 100 | 200 |
| Air permeability (mL/cm² · s) | 500 | 370 | 350 | 320 | 210 |
| Tensile strength (kg/cm²) | 40 | 65 | 220 | 260 | 340 |
| Nonflammability | Nonflammable | Nonflammable | Nonflammable | Nonflammable | Nonflammable |

TABLE 5

| | Sound-absorbing rate of sound absorbing and insulating materials with different PI binder contents | | | | |
|---|---|---|---|---|---|
| Frequency (Hz) | 0 parts by weight | 10 parts by weight | 50 parts by weight | 100 parts by weight | 200 parts by weight |
| 400 | 0.01 | 0.01 | 0.08 | 0.06 | 0.02 |
| 500 | 0.03 | 0.04 | 0.10 | 0.09 | 0.04 |
| 630 | 0.12 | 0.14 | 0.16 | 0.15 | 0.09 |
| 800 | 0.16 | 0.17 | 0.22 | 0.25 | 0.11 |
| 1000 | 0.26 | 0.26 | 0.35 | 0.29 | 0.14 |
| 1250 | 0.32 | 0.34 | 0.43 | 0.41 | 0.16 |
| 1600 | 0.39 | 0.40 | 0.58 | 0.54 | 0.23 |
| 2000 | 0.48 | 0.51 | 0.70 | 0.58 | 0.38 |
| 2500 | 0.64 | 0.68 | 0.79 | 0.67 | 0.43 |
| 3150 | 0.63 | 0.69 | 0.80 | 0.71 | 0.53 |
| 4000 | 0.72 | 0.77 | 0.86 | 0.75 | 0.53 |
| 5000 | 0.80 | 0.83 | 0.99 | 0.79 | 0.57 |
| 6300 | 0.78 | 0.88 | 0.98 | 0.80 | 0.63 |
| 8000 | 0.89 | 0.91 | 0.99 | 0.92 | 0.73 |
| 10000 | 0.90 | 0.92 | 0.98 | 0.92 | 0.80 |

As seen from Table 4 and Table 5, the sound-absorbing rate was improved as the polyimide binder was impregnated into the nonwoven fabric when compared with the nonwoven fabric not impregnated with the polyimide binder. Further, it was confirmed that the sound-absorbing rate of the sound absorbing and insulating material could be controlled with the polyimide binder content.

Test Example 7. Comparison of Properties of Sound Absorbing and Insulating Material Depending on Binders Sound absorbing and insulating materials wherein 50 parts by weight of a binder was impregnated based on 100 parts by weight of an aramid nonwoven fabric were prepared in the same manner as in Example 1. The resins described in Table 6 were used as the binder.

The result of comparing the mechanical properties and sound-absorbing rate of the sound absorbing and insulating materials prepared with different binders is shown in Table 6.

TABLE 6

Physical properties of sound absorbing and insulating materials with different binders

| | Binder resin | | | | |
|---|---|---|---|---|---|
| | Epoxy resin | Phenol resin | Urea resin | Melamine resin | Polyurethane resin |
| Heat resistance temperature (° C. × 1 hr) | 300 | 260 | 190 | 300 | 200 |
| Tensile strength (kg/cm$^2$) | 200 | 165 | 180 | 180 | 170 |
| Flame retardancy | Self-extinguishing | Self-extinguishing | Self-extinguishing | Self-extinguishing | Self-extinguishing |
| Nonflammability | Nonflammable | Nonflammable | Nonflammable | Nonflammable | Nonflammable |

What is claimed is:

1. A sound absorbing and insulating material comprising:
   a nonwoven fabric comprising fiber yarn and an amount of about 30 to 100 wt % of a heat-resistant fiber having a fineness of about 1 to 15 denier based on the total weight of the nonwoven fabric; and
   a polyimide binder impregnated into the nonwoven fabric and present in the same layer as the nonwoven fabric, wherein the polyimide binder is impregnated on the surface of the fiber yarn of the nonwoven fabric and maintains a three-dimensional structure inside the nonwoven fabric, thereby maintaining or further forming micro cavities of the nonwoven fabric.

2. The sound absorbing and insulating material according to claim 1, wherein the polyimide binder is distributed and attached on the surface of the fiber.

3. The sound absorbing and insulating material according to claim 1, wherein the heat-resistant fiber has a limiting oxygen index (LOI) of about 25% or greater and a heat resistance temperature of about 150° C. or greater.

4. The sound absorbing and insulating material according to claim 3, wherein the heat-resistant fiber is one or more selected from a group consisting of an aramid fiber, an oxidized polyacrylonitrile (oxi-PAN) fiber, a polyimide (PI) fiber, a polybenzimidazole (PBI) fiber, a polybenzoxazole (PBO) fiber, a metallic fiber, a carbon fiber, a glass fiber, a basalt fiber, a silica fiber and a ceramic fiber.

5. The sound absorbing and insulating material according to claim 4, wherein the heat-resistant fiber is an aramid fiber or an oxidized polyacrylonitrile (oxi-PAN) fiber having a fineness of about 1 to 15 denier and a yarn length of about 20 to 100 mm.

6. The sound absorbing and insulating material according to claim 1, wherein the nonwoven fabric has a thickness of about 3 to 20 mm and a density of about 100 to 2000 g/m$^2$.

7. The sound absorbing and insulating material according to claim 1, wherein the polyimide binder has a weight-average molecular weight of about 10,000 to 200,000 g/mol.

8. The sound absorbing and insulating material according to claim 1, wherein an amount of about 1 to 300 parts by weight of the polyimide binder is impregnated based on 100 parts by weight of the nonwoven fabric.

9. The sound absorbing and insulating material according to claim 1, wherein the sound absorbing and insulating material is molded to correspond to a three-dimensional shape of an object to which the sound absorbing and insulating material is applied.

10. The sound absorbing and insulating material according to claim 1, wherein the sound absorbing and insulating material is formed in a single layer or multiple layers.

11. The sound absorbing and insulating material according to claim 1, wherein the sound absorbing and insulating material is for a vehicle.

12. A method for manufacturing the sound absorbing and insulating material according to claim 1, comprising steps of:
   a) immersing a nonwoven fabric comprising an amount of about 30 to 100 wt % of a heat-resistant fiber having a fineness of about 1 to 15 denier based on the total weight of the nonwoven fiber in a binder solution in which polyamic acid is dispersed, wherein the nonwoven fabric is impregnated with the polyamic acid;
   b) recovering the nonwoven fabric impregnated with the polyamic acid—from the binder solution; and
   c) curing the recovered nonwoven fabric.

13. The method according to claim 12, wherein curing in the step c) comprises converting the polyamic acid into polyimide.

14. The method according to claim 12, further comprising after the step b), molding the nonwoven fabric impregnated with the polyamic acid—into a desired shape.

15. The method for manufacturing the sound absorbing and insulating material according to claim 12, wherein the step b) comprises steps of: taking out and compressing the nonwoven fabric impregnated with the polyamic acid at a pressure of about 1 to 20 kgf/cm$^2$, taking out the nonwoven fabric impregnated with the polyamic acid and evaporating a solvent by heating at a temperature of about 70 to 200° C., or taking out and compressing the polyamic acid-impregnated nonwoven fabric and evaporating a solvent under the said temperature and pressure conditions.

16. The method according to claim 12, wherein the sound absorbing and insulating material has an amount of about 1 to 300 parts by weight of the polyimide impregnated therein based on 100 parts by weight of the nonwoven fabric.

17. The method according to claim 12, wherein the heat-resistant fiber has a limiting oxygen index (LOI) of about 25% or greater and a heat resistance temperature of about 150° C. or greater.

18. The method according to claim 17, wherein the heat-resistant fiber is one or more selected from a group consisting of an aramid fiber, an oxidized polyacrylonitrile (oxi-PAN) fiber, a polyimide (PI) fiber, a polybenzimidazole (PBI) fiber, a polybenzoxazole (PBO) fiber, a metallic fiber, a carbon fiber, a glass fiber, a basalt fiber, a silica fiber and a ceramic fiber.

19. The method according to claim 18, wherein the heat-resistant fiber is an aramid fiber or an oxidized polyacrylonitrile (oxi-PAN) fiber having a fineness of about 1 to 15 denier and a yarn length of 20 to 100 mm.

20. The method according to claim 12, wherein the nonwoven fabric has a thickness of about 3 to 20 mm and a density of about 100 to 2000 g/m$^2$.

21. The method according to claim 20, wherein the nonwoven fabric is formed by steps comprising: continuously performing up-down needling, down-up needling and up-down needling.

22. The method according to claim 20, wherein the nonwoven fabric is formed with a needle stroke of about 30 to 350 times/m$^2$.

23. The method according to claim 12, wherein the polyimide has a weight-average molecular weight of about 20,000 to 300,000 g/mol.

24. The method according to claim 12, wherein the binder solution comprises an amount of about 1 to 60 wt % of the polyamic acid based on the total weight of the binder solution.

25. The method according to claim 12, wherein the sound absorbing and insulating material is for a vehicle.

26. A method for reducing noise of a noise-generating device, comprising:
   i) checking a three-dimensional shape of a noise-generating device;
   ii) preparing and molding the sound absorbing and insulating material of claim 1 into the three-dimensional shape of the device partially or entirely; and
   iii) bringing the sound absorbing and insulating material adjacent to the noise-generating device.

27. The method according to claim 26, wherein the noise-generating device is a motor, an engine or an exhaust system.

28. The method according to claim 26, wherein the sound absorbing and insulating material is brought adjacent to the noise-generating device by attaching the sound absorbing and insulating material to the noise-generating device, providing the sound absorbing and insulating material with a distance from the noise-generating device, or molding the sound absorbing and insulating material as a part of the noise-generating device.

29. A vehicle comprising a sound absorbing and insulating material of claim 1.

* * * * *